(12) United States Patent
Hohler et al.

(10) Patent No.: US 12,207,763 B2
(45) Date of Patent: Jan. 28, 2025

(54) AUTOMATED FRYER WITH SELECTIVELY ACTIVATED HEATING ELEMENTS

(71) Applicant: Henny Penny Corporation, Eaton, OH (US)

(72) Inventors: Melissa M. Hohler, Kettering, OH (US); Steven V. Ricca, Upper Arlington, OH (US); Thomas M. Smith, Lewisburg, OH (US)

(73) Assignee: Henny Penny Corporation, Eaton, OH (US)

( * ) Notice: Subject to any disclaimer, the term of this patent is extended or adjusted under 35 U.S.C. 154(b) by 0 days.

(21) Appl. No.: 18/402,093

(22) Filed: Jan. 2, 2024

(65) Prior Publication Data

US 2024/0130565 A1     Apr. 25, 2024

Related U.S. Application Data

(60) Division of application No. 18/058,925, filed on Nov. 28, 2022, now Pat. No. 11,910,957, which is a continuation of application No. 16/765,551, filed as application No. PCT/US2018/063272 on Nov. 30, 2018, now Pat. No. 11,529,019.

(60) Provisional application No. 62/592,920, filed on Nov. 30, 2017.

(51) Int. Cl.
*A23L 5/10*     (2016.01)
*A47J 37/12*    (2006.01)

(52) U.S. Cl.
CPC .............. *A47J 37/1228* (2013.01); *A23L 5/11* (2016.08); *A47J 37/1219* (2013.01); *A47J 37/1266* (2013.01); *A47J 37/1271* (2013.01); *A47J 37/1276* (2013.01); *A47J 37/1295* (2013.01)

(58) Field of Classification Search
CPC ..... A23L 5/11; A47J 37/1209; A47J 37/1219; A47J 37/1228; A47J 37/1242; A47J 37/1257; A47J 37/1266
See application file for complete search history.

(56) References Cited

U.S. PATENT DOCUMENTS

| | | |
|---|---|---|
| 1,205,026 A | 11/1916 | Rodgers |
| 1,310,495 A | 7/1919 | Ford |
| 1,699,221 A | 1/1929 | Carter |
| 2,475,523 A | 7/1949 | Schroeder |
| 2,550,758 A | 5/1951 | Bemis |
| 3,164,406 A | 1/1965 | Barry |
| 3,393,295 A | 7/1968 | Ivar et al. |
| 3,505,072 A | 4/1970 | Rullman |
| 3,881,090 A | 4/1975 | Scott |
| 4,282,423 A | 8/1981 | Volz |
| 4,922,435 A | 5/1990 | Cahlander et al. |
| 4,951,558 A | 8/1990 | Figliuzzi |
| 5,125,328 A | 6/1992 | Grandi |
| 5,142,968 A | 9/1992 | Caron et al. |
| 5,172,328 A | 12/1992 | Cahlander et al. |
| 5,743,172 A | 4/1998 | Weiss et al. |
| 5,921,172 A | 7/1999 | Kiczko et al. |
| 6,058,245 A | 5/2000 | McNamara, Jr. |
| 6,515,262 B1 | 2/2003 | Li |
| 8,826,807 B1 | 9/2014 | Bourgeois |
| 9,220,371 B1 | 12/2015 | Demirakos et al. |
| 10,945,559 B2 | 3/2021 | Leader et al. |
| 11,266,268 B2 | 3/2022 | Gill et al. |
| 2016/0278577 A1 | 9/2016 | Kim et al. |
| 2017/0095118 A1 | 4/2017 | Loss et al. |
| 2018/0160853 A1 | 6/2018 | Miyoshi |
| 2020/0345179 A1 | 11/2020 | Barandun et al. |
| 2021/0068591 A1 | 3/2021 | HenneBarrows et al. |
| 2022/0047117 A1 | 2/2022 | Yamada |

FOREIGN PATENT DOCUMENTS

JP     S63288117 A     11/1988

OTHER PUBLICATIONS

International Searching Authority, Search Report and Written Opinion issued in International Patent Application No. PCT/US2018/063272 mailed Feb. 5, 2019 (16 pages).
International Searching Authority, Preliminary Report on Patentability issued in International Patent Application No. PCT/US2018/063272 mailed Dec. 2, 2019 (20 pages).

*Primary Examiner* — Reginald Alexander
(74) *Attorney, Agent, or Firm* — Wood Herron & Evans LLP

(57) ABSTRACT

A fryer and method for cooking food products is provided that automates the movement of baskets carrying the food products. The fryer) includes a cooking chamber with a heating element located therein for heating cooking medium in the cooking chamber. The fryer also includes at least one vertical transport assembly that selectively engages with and moves the basket vertically into and out of the cooking medium. A horizontal transport assembly selectively engages with and moves the basket horizontally between different positions. The horizontal transport assembly hands off the basket to and from the vertical transport assembly, and first and second hooks on the horizontal transport assembly engage with front and rear receiving mechanisms on the basket to continuously maintain at least two points of contact with the basket. This allows for controlled pivotal movements of the basket when food products are to be added or removed from the basket.

12 Claims, 16 Drawing Sheets

AUTOMATED FRYER WITH SELECTIVELY ACTIVATED HEATING ELEMENTS

CROSS-REFERENCE TO RELATED APPLICATION

This application is a division of U.S. Nonprovisional application Ser. No. 18/058,925 filed Nov. 28, 2022 (published as U.S. Pub. No. 2023/0093737), which is a continuation of U.S. Nonprovisional application Ser. No. 16/765,551, filed Mar. 20, 2020 (issued as U.S. Pat. No. 11,529,019), which is a national stage entry of Intl. Patent Application No. PCT/US2018/063272, filed Nov. 30, 2018 (published as Intl. Pub. No. WO/2019/108909), which claimed the benefit of U.S. Provisional Application Ser. No. 62/592,920, filed Nov. 30, 2017, the disclosures of which are each incorporated by reference herein.

TECHNICAL FIELD

This application relates generally to food product cooking systems and methods. More specifically, this application describes mechanisms and methods for adding space and time efficiencies in food production environments such as restaurants.

BACKGROUND

Cooking devices, such as fryers, are used to cook various food products, e.g., poultry, fish, potato products, and the like. Such cooking devices may include one or more cooking chambers, e.g., fryer pots or vats, which may be filled with a cooking medium, e.g., an oil, a liquid shortening or a meltable-solid shortening. Such cooking apparatus also may include a heating element, e.g., an electrical heating element, such as a heating coil, or a gas heating element, such as a gas burner and gas conveying tubes, which heats the cooking medium in the cooking chamber. After the cooking medium reaches a preset cooking temperature, the food products are placed into the cooking medium such that the food products are cooked in the cooking medium. For example, the food products may be positioned inside a basket, e.g., a wire basket, and submerged in the cooking medium for a predetermined amount of time sufficient to cook the food products.

Restaurants strive to increase production in order to satisfy customer demand. One way to increase production is to utilize a high-volume fryer, such as by replacing a restaurant's pre-existing traditional open fryer with a high-volume fryer. However, high volume fryers are typically relatively large, and restaurants must operate within the space constraints imposed by the buildings which they occupy. As a result, restaurant equipment, including fryers, must be sized to fit within certain parameters. For example, kitchen layouts may allow a particular amount of space for a fryer and may be unable to accommodate fryers having footprints greater than that space. Some restaurants may allow a footprint of only approximately 92 inches by approximately 30 inches for a fryer, as well as an associated freezer and a preparation or holding area. Of this footprint, a traditional open fryer may only occupy approximately 42 inches by 30 inches, in one example. The space allotted to the fryer may also be vertically bounded by a corresponding hood, such as an exhaust or vent hood, positioned thereover. However, a high-volume fryer of a conventional design may require significantly more space than this. Many restaurants would be required to undergo substantial building renovations, replace previously installed hoods, and/or sacrifice space intended for other uses in order to reap the benefits of high-volume fryers. Those reconfigurations are highly disfavored, and sometimes impossible.

Thus, it would be desirable to provide systems and methods to cook food product in a more efficient manner, specifically with regard to time and space considerations providing simplified access and cleaning to all cooking areas.

SUMMARY

In one embodiment, a fryer for cooking food products is provided. The fryer includes at least one cooking chamber configured to hold a cooking medium and at least one heating element located within the at least one cooking chamber. The fryer also includes at least one vertical transport assembly configured to selectively engage with a basket and that actuates to vertically move the basket between a plurality of vertical positions relative to the cooking medium. Thus, the vertical transport assembly moves the basket and any food products therein into and out of the cooking medium. The fryer further includes a horizontal transport assembly configured to selectively engage with the basket and that actuates to move the basket between a plurality of horizontal positions to thereby move the basket and any food products therein between the at least one cooking chamber and other kitchen stations adjacent the fryer. The horizontal transport assembly includes a first securing mechanism configured to selectively attach with a front receiving mechanism located on a front side of the basket and a second securing mechanism configured to selectively attach with a rear receiving mechanism located on a rear side of the basket. The first and second securing mechanisms continuously maintain at least two points of contact with the basket whenever the basket is engaged with the horizontal transport assembly, which allows the basket to pivot in a controllable manner. The fryer thereby automates all basket movements at and around the fryer to free up an operator to perform other tasks in the kitchen, such as when customer demand is high.

In one aspect, the plurality of vertical positions includes first, second and third vertical positions. In the first vertical position, the basket is positioned at least partially within the cooking medium. The second vertical position is located above the first vertical position and allows the first and second securing mechanisms of the horizontal transport assembly to move underneath the front and rear receiving mechanisms of the basket. The third vertical position is located between the first and second vertical positions and defines a position in which the basket is handed off between selective engagement with the vertical transport assembly and selective engagement with the horizontal transport assembly.

In another aspect, the fryer includes at least two cooking chambers and at least two vertical transport assemblies, each configured to selectively engage with and hand off a basket to the horizontal transport assembly such that a plurality of baskets is automatically moved and managed by the fryer. The other kitchen stations adjacent the fryer include a freezer/dispenser unit configured to automatically deliver food products into the baskets for cooking at the fryer and a hot holding station where cooked food products from the fryer are packaged and prepared for delivery to customers.

In yet another aspect, the first and second securing mechanisms include first and second hooks. To this end, each of the first and second hooks includes a first portion located directly below an opening of the hook and a second portion bounded on three sides by walls of the hook and configured to provide a locked position for pivotal movement of the basket. The second portion of the first and second hooks is positioned vertically above and laterally spaced horizontally from the first portion. In this regard, the first and second portions of the first and second hooks collectively define an elongated slot communicating with the opening of the hook at the first portion and sized to closely receive one of the front and rear receiving mechanisms. A cylindrical rod member may define each of the front and rear receiving mechanisms extending from the basket.

In a further aspect, the fryer includes a tilting mechanism attached to the fryer at a lateral end thereof such that the horizontal transport assembly moves the basket into abutment with the tilting mechanism, and then further horizontal movement of the basket causes pivoting of the basket around a pivot axis defined through the second portion of the first and second hooks.

In one aspect, the basket further comprises first and second tilt control elements positioned on each of the front and rear sides of the basket. The tilt control elements are configured to interact with a tilting mechanism attached to the fryer. For example, the first and second tilt control elements include pegs rigidly coupled to the basket. The tilting mechanism in such embodiments includes a curvilinear shaped plate that interacts with the pegs of the basket in a cam and follower relationship during pivotal movement of the basket.

In another aspect, each of the horizontal transfer assembly and the at least one vertical transport assembly includes a motor that is located behind the fryer and away from an operator. Each of the transfer assemblies also includes a belt drive moved by the motor and configured to cause corresponding movements of the basket.

In a further aspect, the basket may be selectively disengaged from all of the transfer assemblies to enable a manual operation mode at the fryer. This mode may also be ideally configured for cleaning of the fryer.

In another embodiment of the invention, a method of cooking food products with a fryer is provided. The method includes moving a basket configured to contain food products in a vertical direction into and out of cooking medium within a cooking chamber by actuating a vertical transport assembly to move between a plurality of vertical positions. The method also includes handing off the basket from the vertical transport assembly into selective engagement with a horizontal transport assembly that actuates to move the basket between a plurality of horizontal positions. The basket is then moved with the horizontal transport assembly between a position above the cooking chamber and other kitchen stations adjacent the fryer configured to deliver uncooked food products into the basket or configured to receive cooked food products from the basket. The horizontal transport assembly continuously maintains at least two points of contact with the basket whenever the basket is engaged with the horizontal transport assembly, which allows the basket to pivot in a controllable manner.

In one aspect, the method includes moving the basket to a freezer/dispenser unit and actuating the freezer/dispenser unit to automatically deliver food products into the basket, and moving the basket to a hot holding station to automatically dump cooked food products from the basket into the hot holding station. These steps may further include moving the basket horizontally into contact with a tilting mechanism attached to the fryer at a lateral end thereof and then continuing to move the basket horizontally while engaged with the tilting mechanism to cause pivotal movement of the basket, such that the basket is configured to receive or dump food products.

In another aspect, the horizontal transport assembly includes first and second hooks that engage with front and rear receiving mechanisms of the basket in such a manner that the front and rear receiving mechanisms can pivot in the first and second hooks to define a pivot axis for pivotal movement of the basket. In a further aspect, the fryer includes at least two of the cooking chambers and at least two of the vertical transport assemblies, each configure to selectively engage with and hand off a basket to the horizontal transport assembly such that a plurality of baskets is automatically moved and managed by the fryer. By disengaging all of the transport assemblies from the basket, a manual operation of the fryer is enabled, which may be desired in certain circumstances. Moreover, this provides a fallback operation in case the transport assemblies fail or require maintenance.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, explain the one or more embodiments of the invention.

DETAILED DESCRIPTION

Figure 1:
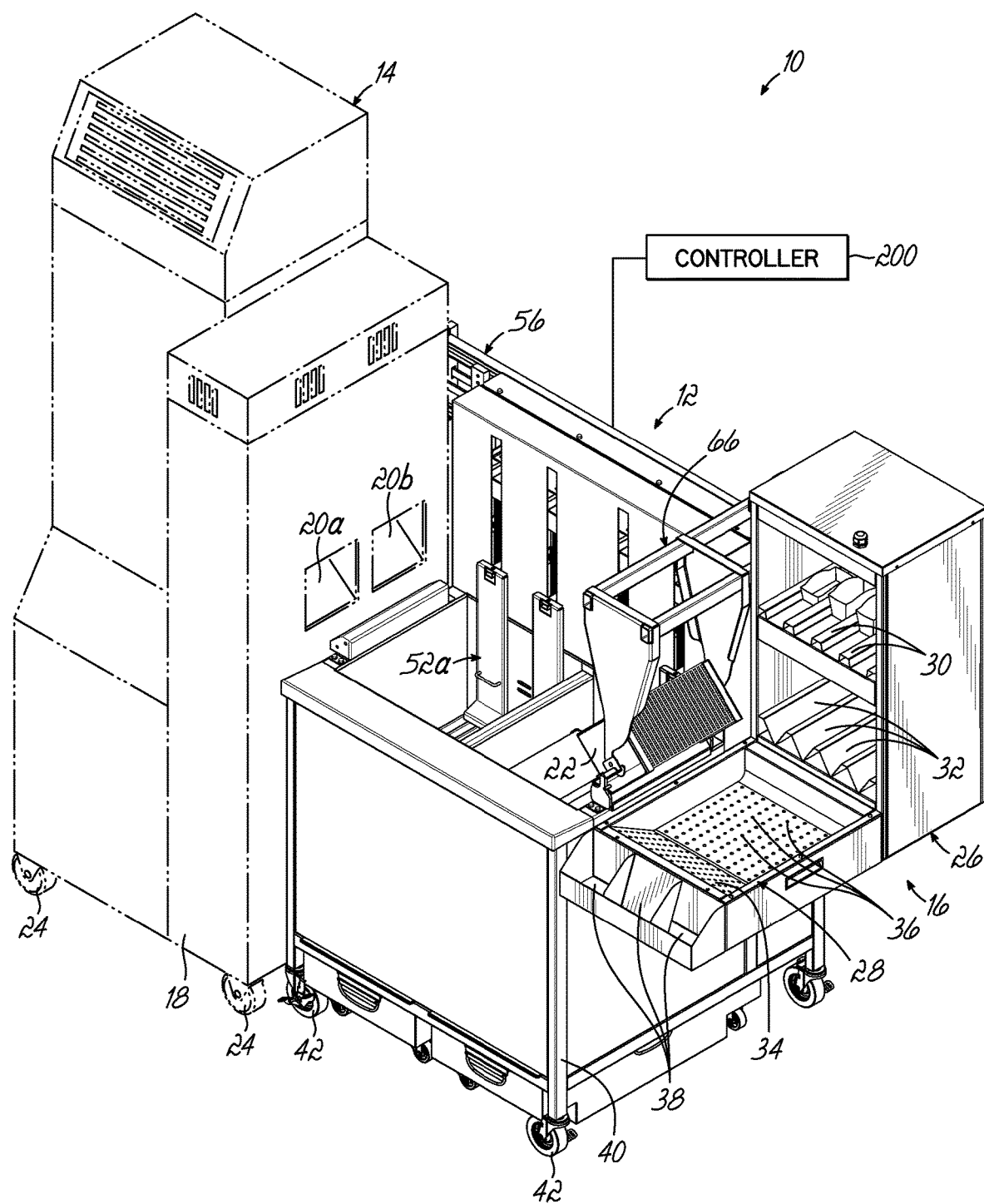
FIG. 1 is a front perspective view of an exemplary automated cooking system in accordance with an embodiment of the invention.
Figure 2:
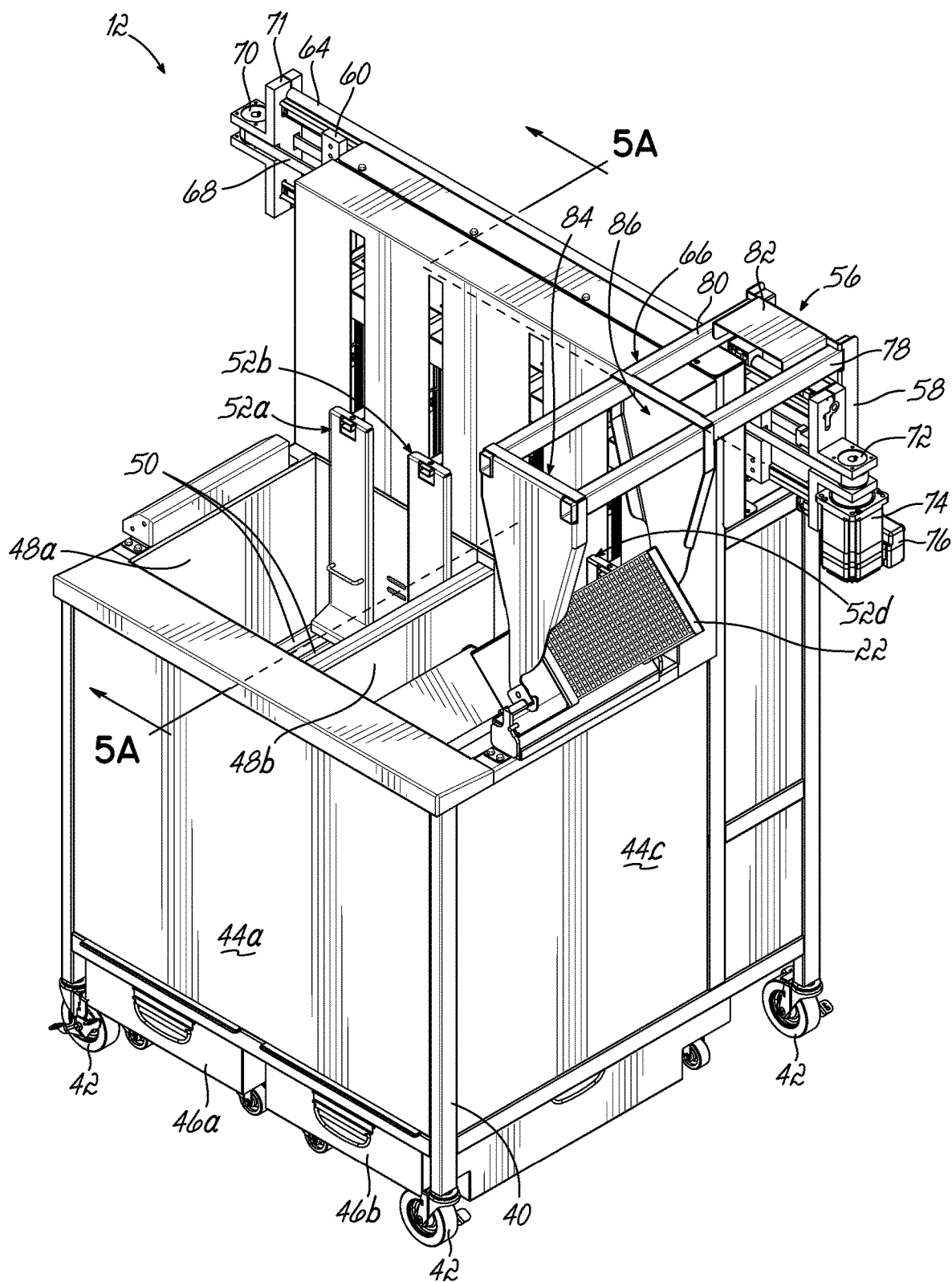
FIG. 2 is a front perspective view of the fryer shown in FIG. 1 in accordance with another embodiment of the invention.
Figure 3:
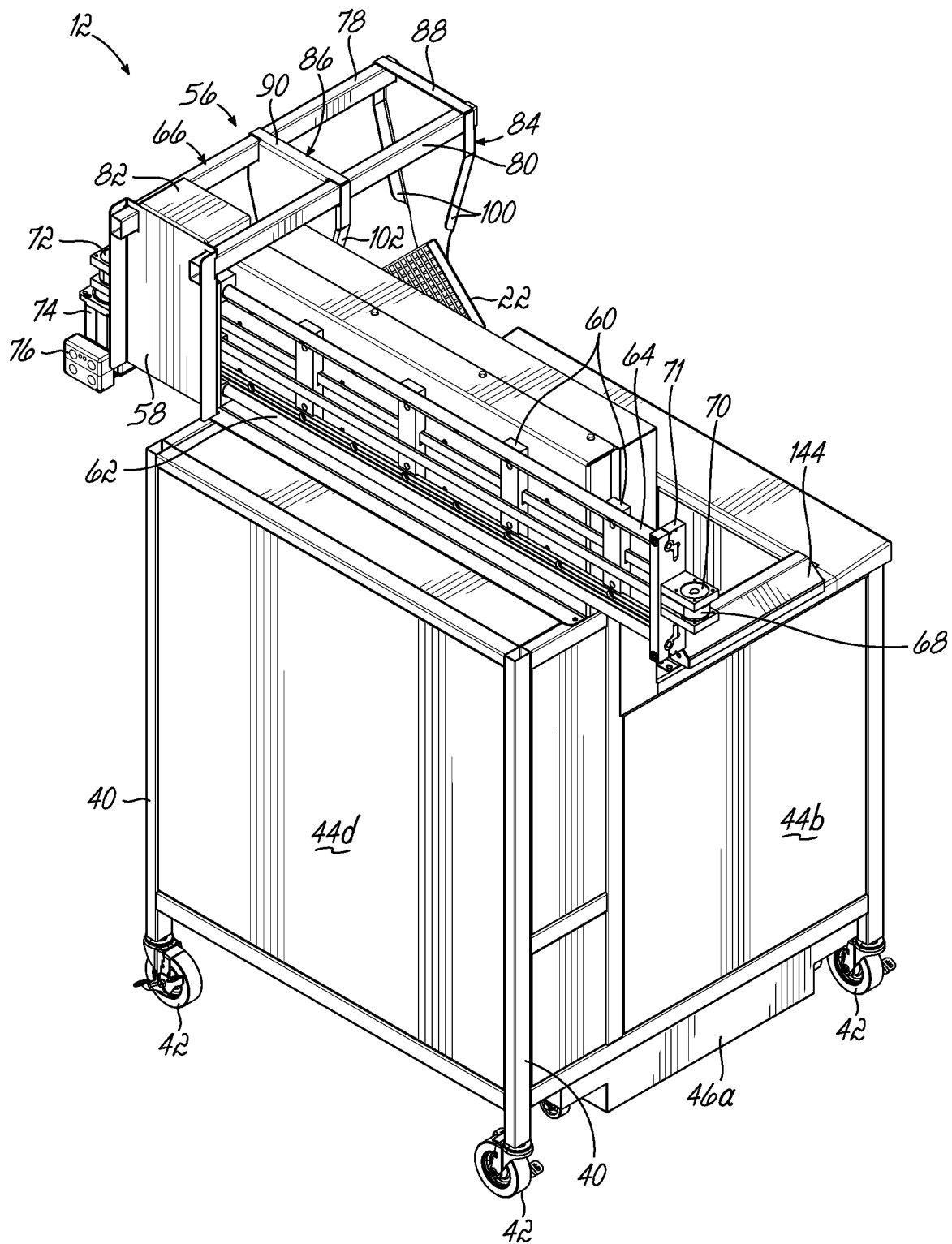
FIG. 3 is a rear perspective view of the fryer shown in FIG. 2, where the horizontal transport assembly of the fryer is belt driven.

With reference to FIGS. 1-3, an automated cooking system 10 including an automated cooking apparatus, such as a fryer 12, is shown in accordance with one embodiment. As set forth in further detail below, the system 10 and/or fryer 12 provide improved efficiency in cooking operations. For example, the system 10 and/or fryer 12 can cook a high volume of food products in a relatively small space. In one embodiment, the system 10 may cook at least approximately 1.5 times the amount of food as a traditional open fryer while occupying the same floor space. The system 10 provides a vertical transport assembly and a horizontal transport assembly to enable automated basket movement between stations at the fryer 12 and at load/unload points relative to the fryer 12, and such assemblies improve the overall efficiency and throughput of cooking food products at the fryer 12. These and other features of the automated cooking system 10 and the fryer 12 are set forth in further detail below to clarify each of these functional advantages and other benefits provided in this disclosure.

FIG. 1 shows the automated cooking system 10 as including the fryer 12, a freezer 14, and a hot holding station 16. The freezer 14 is of a conventional design, and thus is not shown in detail in the figures. As shown, the freezer 14 includes a dispenser 18 for dispensing food product. Food product such as, for example, waffle fries, is dispensed into the fryer 12 from the dispenser 18 of the freezer 14 using chutes, such as first and second chutes 20a, 20b shown in FIG. 1, cooked in the fryer 12, and then dispensed from the fryer 12 to the hot holding station 16, as discussed in greater detail below. Instead of the food product being dispensed through chutes 20a, 20b, a feed screw, conveyor, or other suitable means may be used to deliver the food to the basket 22. While a basket is shown and described, it is appreciated that other moveable food product receptacles are also envisioned. It may be desirable that the chutes 20a, 20b deliver the uncooked food product at a predetermined height. Additionally, the freezer 14 may be mounted on a plurality of wheels 24, so that the freezer 14 may be easily moveable on a surface, such as a floor. Instead of delivering the uncooked food product from the freezer 14, the uncooked food product may be in a storage device. It will be understood that different designs of the freezer 14 may be used without departing from the scope of the invention, as this is but one example for use in a fully-automated version of the cooking system 10.

The hot holding station 16 receives cooked food product from the basket 22 of the fryer 12 as will be described in greater detail below. The hot holding station 16 includes a hot holding cabinet 26 and a hot holding receiving area 28. As shown, the hot holding cabinet 26 may include a plurality of vertical slots 30 and/or angled corrugated slots 32 to hold the now-cooked food product following packaging at the receiving area 28. The hot holding receiving area 28 may include an angled front portion 34, and a plurality of apertures 36 for air flow to enable the cooked food product to remain crispy. Receptacles 38 may be in the front of the hot holding receiving area 28. Since the throughput of this automated cooking system 10 exceeds current systems, the hot holding receiving area 28 is generally larger to enable one or more workers to package the cooked food product and keep up with the throughput of the automated cooking system 10. It will be understood that other designs of hot holding and preparation stations may be used with the fryer 12 in other embodiments without departing from the scope of this invention.

FIGS. 2 and 3 show an exemplary embodiment of the fryer 12. The fryer 12 includes a frame 40 mounted on a plurality of wheels 42, so that the fryer 12 may be easily moveable on a surface, such as a floor. In one embodiment, one or more of the wheels 42 are lockable to prevent unwanted movement of the fryer 12 during operation. Alternatively, the wheels 42 may be eliminated if desired. A plurality of wall panels is provided on the frame 40 to cover various interior portions of the frame 40. As shown, these wall panels include a front wall panel 44a, a left side wall panel 44b, a right-side wall panel 44c, and a rear wall panel 44d adjacent a rear side of the fryer 12. While not shown, various fryer components such as, for example, oil filtration and recirculation components, may be supported by and/or housed by the frame 40 within the wall panels 44a-44d. These components are of a conventional design, and thus, are not shown in detail in the Figures. Drawers 46a, 46b may be located near the bottom of the fryer 12 to remove the already used cooking medium. According to another embodiment, drawers 46a, 46b may be as wide as the fryer 12. For example, the drawers 46a, 46b may not side-by-side as shown, but rather, one in the rear, one in the front.

With continued reference to FIGS. 2 and 3, the fryer 12 includes two cooking chambers 48a, 48b, each configured to hold a cooking medium. As shown, each cooking chamber 48a, 48b is configured to hold two baskets 22 in this embodiment, for a total of four baskets 22 in the fryer 12.

However, more or fewer cooking chambers 48a, 48b are also envisioned in other embodiments, with each cooking chamber 48a, 48b being configured to hold one or more baskets 22. At least one heating element 50 is located within each cooking chamber 48a, 48b. However, it is envisioned that each cooking chamber 48a, 48b may include any number of heating elements 50 in any arrangement, as may be desired. The heating element 50 is configured to heat the cooking medium to a predetermined temperature. The heating element 50 may be positioned in at least a lower portion 54 (shown in FIG. 5A) of each cooking chamber 48a, 48b for heating the cooking medium to cook the food products therein.

Figure 11:
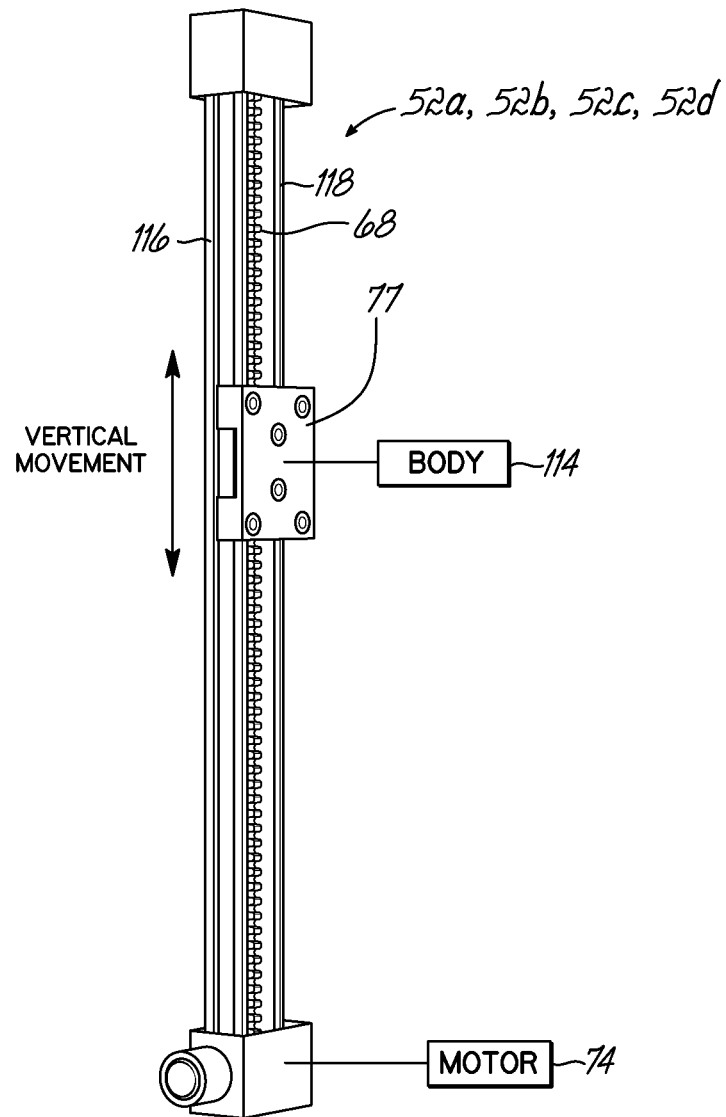
FIG. 11 is a perspective view of an actuator of a vertical transport assembly according to an exemplary embodiment.

With continued reference to FIGS. 2 and 3, the fryer 12 includes four vertical transport assemblies 52a, 52b, 52c and 52d, which are configured to raise and lower the baskets 22 out of and into the cooking chambers 48a, 48b. It is envisioned that each cooking chamber 48a, 48b may contain only a single basket 22, which is movable using one of the vertical transport assemblies 52a-52d. It is also envisioned that a basket 22 may be used with different cooking chambers 48a, 48b and/or different vertical transport assemblies 52a-52d. Mounted behind the cooking chamber 48a, 48b and within the rear wall panel 44d in the rear of the fryer 12 are the motors and other corresponding components for each of the vertical transport assemblies 52a-52d. For example, the motors for each of the vertical transport assemblies 52a-52d are located immediately behind each respective basket 22, as shown in FIG. 11. As a result, according to an exemplary embodiment, two motors are behind each cooking chamber 48a, 48b, for a total of four motors.

As shown in FIGS. 2 and 3, the fryer 12 also includes a horizontal transport assembly 56 that is configured to move the basket 22 between a plurality of horizontal positions. According to an exemplary embodiment, the actuator (shown in FIG. 11) of each of the vertical transport assemblies 52a-52d may operate in a similar manner as the actuator (shown in FIG. 10) of the horizontal transport assembly 56, where a belt is captured on a sliding plate, with some differences being the vertical transport assemblies 52a-52d are shorter and smaller. It is appreciated, of course, that the actuators of the vertical transport assemblies 52a-52d are intended to move vertically, while the actuator of the horizontal transport assembly 56 is configured to move horizontally. The examples of the actuators for the horizontal and vertical transport assemblies shown in FIGS. 10 and 11 are but one possible set of elements that can be used to move the baskets 22 in the desired manners as described throughout this specification.

Figure 10:
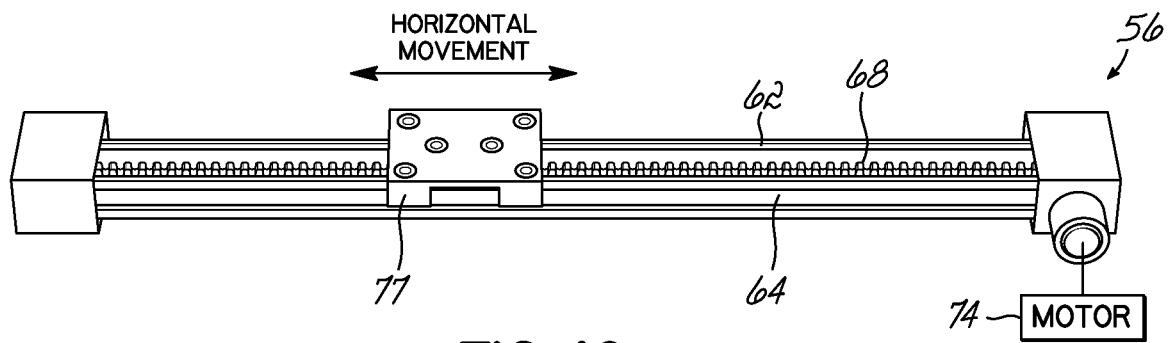
FIG. 10 is a perspective view of an actuator of a horizontal transport assembly according to an exemplary embodiment.

According to an exemplary embodiment, the horizontal transport assembly 56 includes a frame 58 that is mounted to a plate 77 as shown in FIG. 10. On the opposite side of the plate 77, the belt 68 of the horizontal transport assembly 56 is attached (note the two screws in the middle of the plate 77 for capturing and tensioning the belt). When the belt 68 moves, the plate 77 moves, moving the frame 58. As shown, the frame 58 is not attached to the fryer 12. The supports 60 are part of the sliding assembly and provide mounting holes, to maintain alignment/spacing between lower and upper rods 62, 64 (on the horizontal transport assembly 56) and the first and second rods 116, 118 (on each of the vertical transport assemblies 52a-52d) and add rigidity. Regarding the actuator of the horizontal transport assembly 56 shown in FIG. 10, the plate 77 is positioned to face towards the rear of the fryer 12. The frame 58 mounts to this plate 77 and comes up/over the fryer 12 toward the front of the fryer 12. A motor 74 protrudes towards the wall. While not shown, it is also envisioned that the vertical transport assembly 52a-5d may be ball-screw driven.

The overhead gantry 66 travels horizontally using a belt 68, which is shown as being a continuous belt according to an exemplary embodiment. As shown in FIG. 3, the belt 68 extends around both a left side roller 70 and a right-side roller 72. The left side roller 70 is supported by a frame member 71 connected to the lower and upper rods 62, 64. The belt 68 is moved using the motor 74 which is controlled using a controller 76 enabling an overhead gantry 66 of the horizontal transport assembly 56 to move to the desired horizontal position. The controller 76 interfaces with, or is part of the system controller 200, which is described in greater detail below. As shown, the motor 74 is located behind the fryer 12 and away from the operator. The horizontal transport assembly 56 is configured to service each basket 22 associated with each cooking chamber 48a, 48b.

The overhead gantry 66 is coupled to the frame 58 using any of a variety of known fastening methods, such as welding, for example. The horizontal transport assembly 56 may include a counterweight on the rear side of the fryer 12 to offset the weight of the overhead gantry 66. First and second parallel bars, shown as left and right bars 78, 80 in FIGS. 1-3, extend through the frame 58 from the rear of the fryer 12 to the front of the fryer 12. A spacing member 82 may be included to ensure the left and right bars 78, 80 maintain their proper spacing. The overhead gantry 66 includes a front arm 84 and a rear arm 86 that are each rigidly attached to the left and right bars 78. The front and rear arms 84, 86 are configured to interact with the basket 22, as will be discussed in greater detail below. More specifically, the upper portion 88 of the front arm 84 and the upper portion 90 of the rear arm 86 are attached to both the left and right bars 78, 80.

Figure 4:
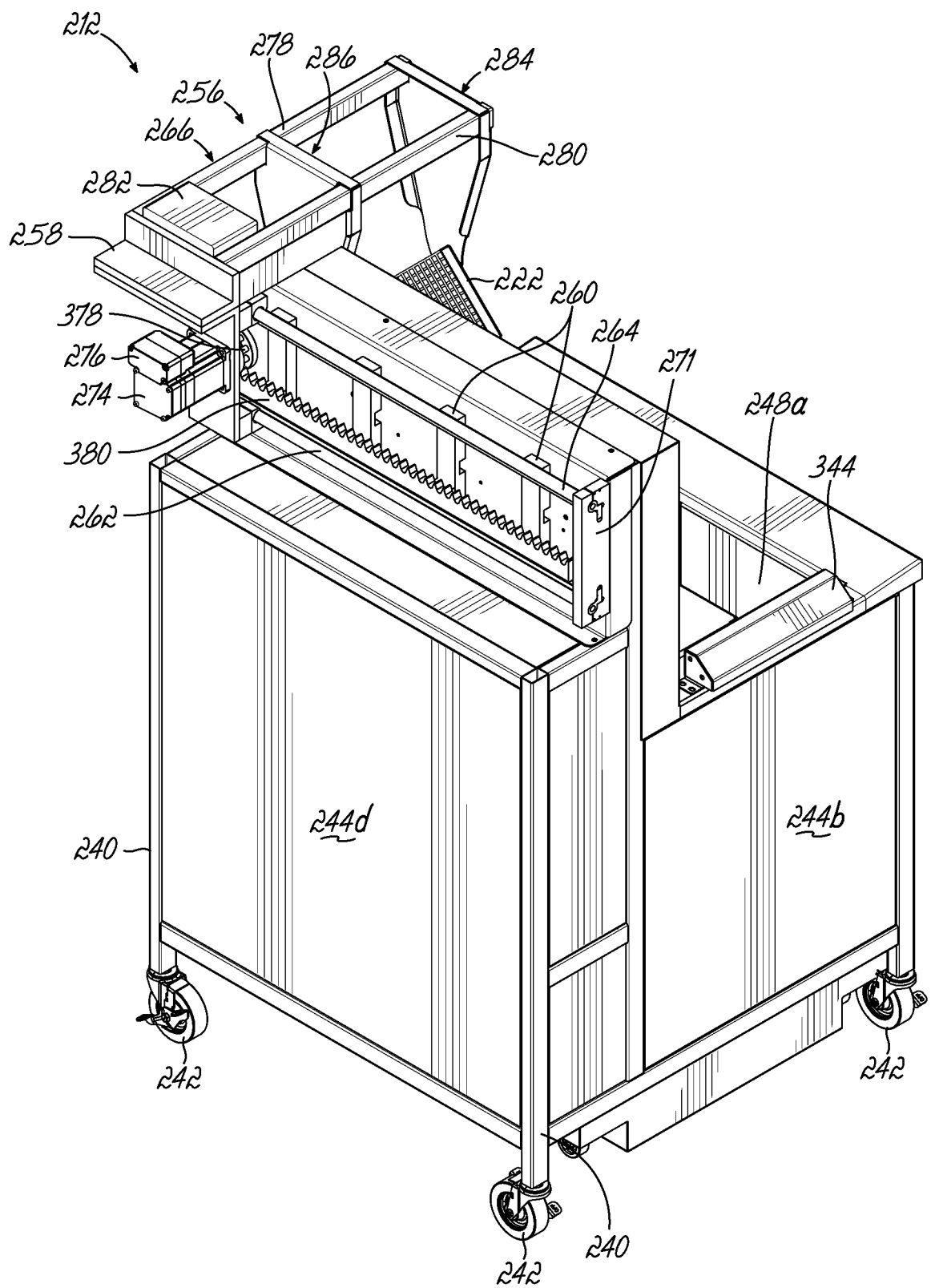
FIG. 4 is a rear perspective view of a fryer in accordance with another embodiment of the invention, where the horizontal transport assembly of the fryer is gear driven.

Now with reference to FIG. 4, where the horizontal transport assembly 256 of the fryer 220 is gear driven according to another exemplary embodiment. The fryer 212 includes many of the same elements as the previously described embodiment (fryer 12), and these elements have been provided with similar reference numbers in the 200 series where the elements are substantially similar or identical. For example, the fryer 212 of this embodiment again includes basket 222, frame 240, wheels 242, left side wall panel 244b, rear wall panel 244d, cooking chamber 248a, frame 258, supports 260, lower rod 262, upper rod 264, overhead gantry 266, frame member 271, motor 274, left bar 278, right bar 280, spacing member 282, front arm 284, rear arm 286, and wedge 344. Although many of these elements have slightly modified shapes or profiles in this embodiment, the fryer 212 and its elements function as described above except where the differences are outlined in further detail below (the detailed description of these identical or substantially similar elements is largely not repeated herein for the sake of brevity). In this embodiment, the horizontal transport assembly 256 of the fryer 212 is gear driven where the motor 274 is operatively coupled to the drive gear 378, that moves along a toothed rack 380. The horizontal transport assembly moves along the lower and upper rods 262, 264. In all other respects, the fryer 212 operates similarly to the first embodiment.

With this understanding of the structure of the fryer 12 in mind (as well as the alternative embodiment fryer 212, which functions in substantially a similar manner), the motion of the basket 22 will now be described in connection with FIGS. 5A-7I. As shown, the first and second securing mechanisms are shown as front and rear hooks 96, 98 that are attached to the respective front and rear arms 84, 86 of the overhead gantry 66. However, other suitable securing mechanisms are also envisioned. As shown, the lower portion 92 of the front arm 84 includes a front hook 96 and the lower portion 94 of the rear arm 86 includes a rear hook 98. Additionally, the front arm 84 includes a flange portion 100 and the rear arm 86 includes a flange portion 102 for increased strength and rigidity.

While the movement of the basket 22 respective to the first cooking chamber 48a and the second vertical transport assembly 52b is shown and described, this movement also applies to the other baskets 22 in the same first cooking chamber 48a, and other baskets 22 in other cooking chambers, such as the second cooking chamber 48b. For example, this same description of motion applies to the basket 22 that is raised and lowered by first vertical transport assembly 52a within the first cooking chamber 48a, the basket 22 that is raised and lowered by the third vertical transport assembly 52c within the second cooking chamber 48b, and the basket 22 that is raised and lowered by the fourth vertical transport assembly 52d within the second cooking chamber 48b. Moreover, it is envisioned that this description applies if the fryer 12 includes more or fewer cooking chambers 48a, 48b and/or more or fewer vertical transport assemblies 52a-52d.

Figure 5A:
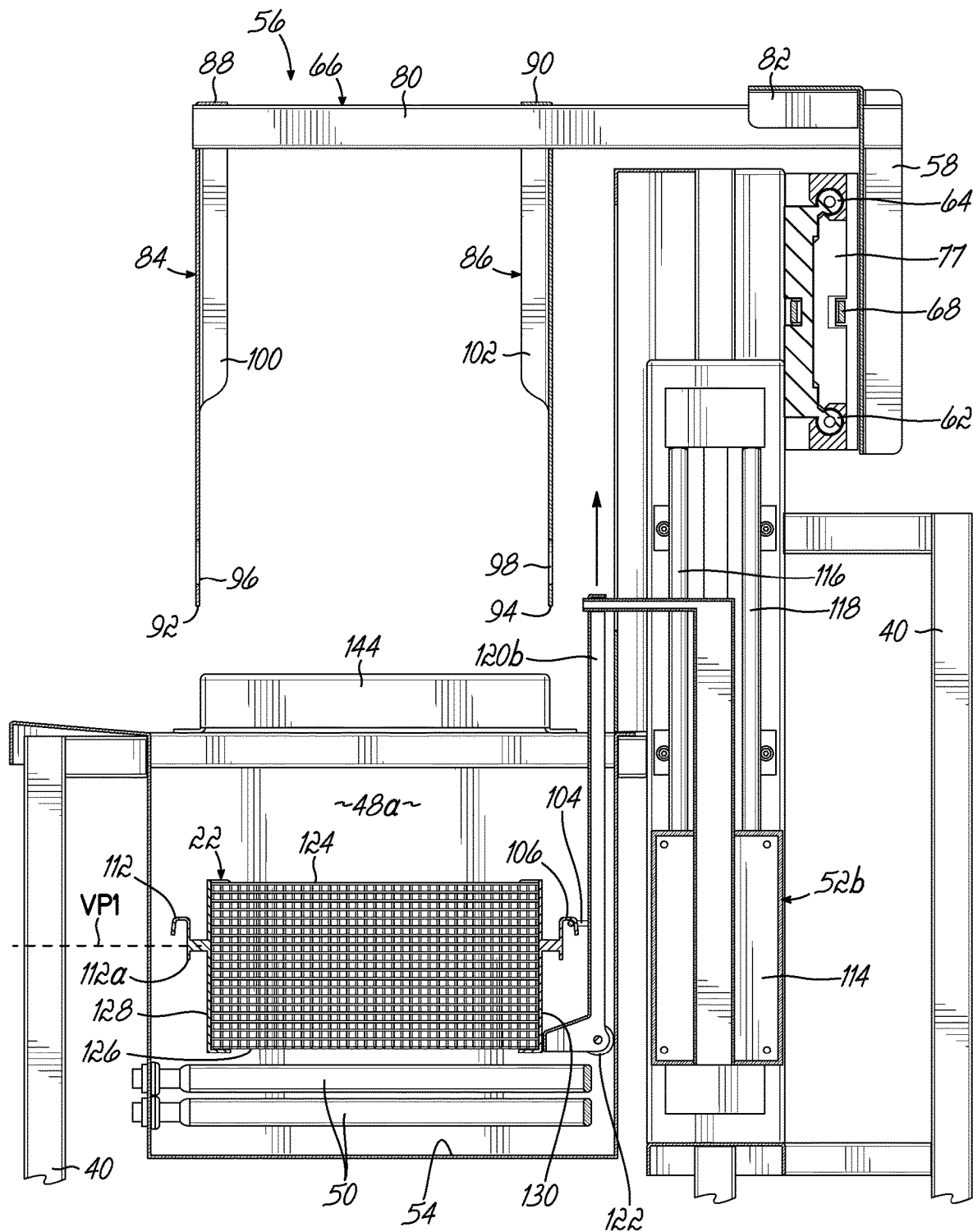
FIG. 5A is a partial cross-sectional side view of the exemplary fryer of FIG. 2 taken across line 5A-5A, showing the basket coupled to the second vertical transport assembly at a first vertical position.
Figure 5B:
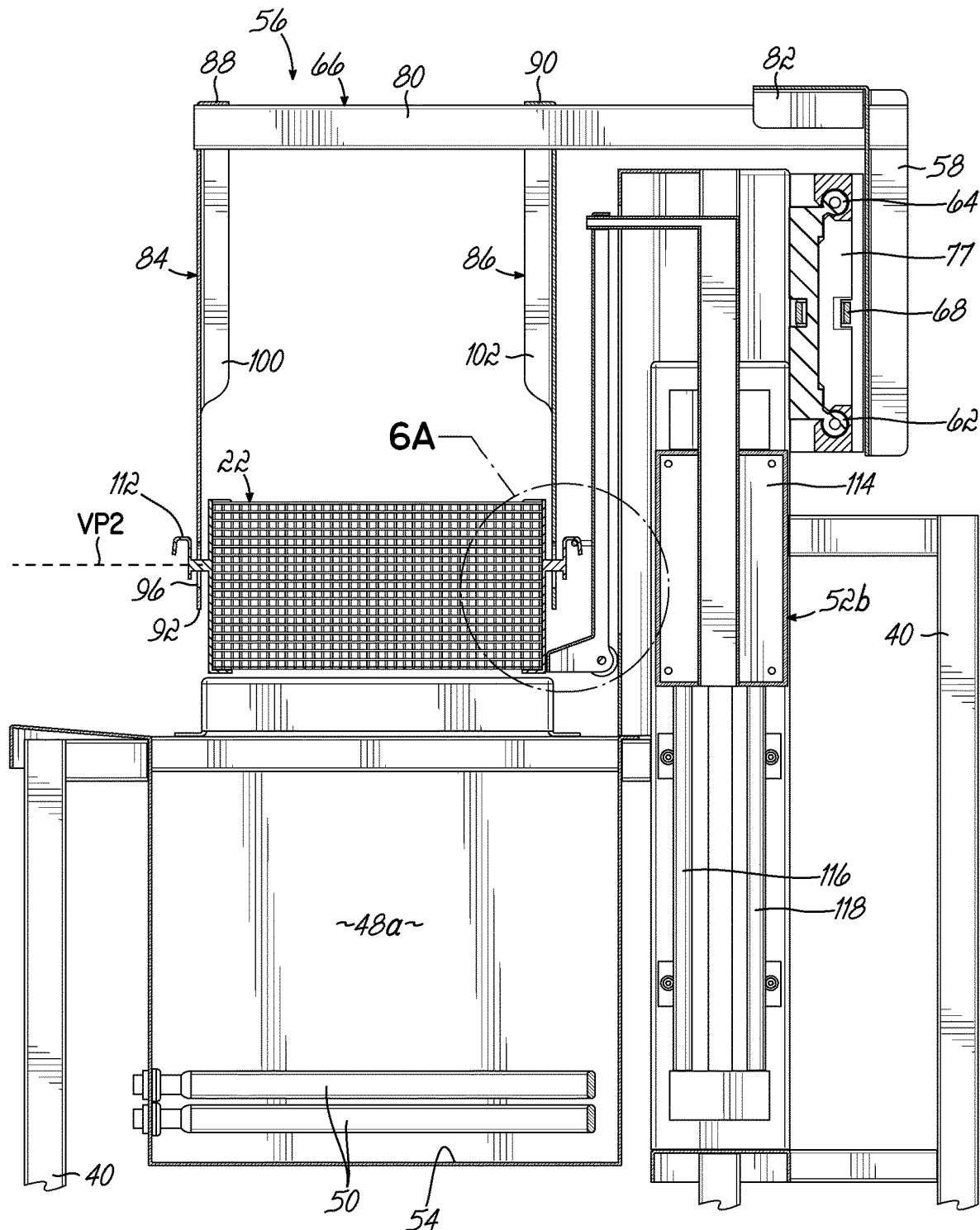
FIG. 5B is a partial cross-sectional side view like FIG. 5A, showing the basket coupled to the second vertical transport assembly at a second vertical position.
Figure 5C:
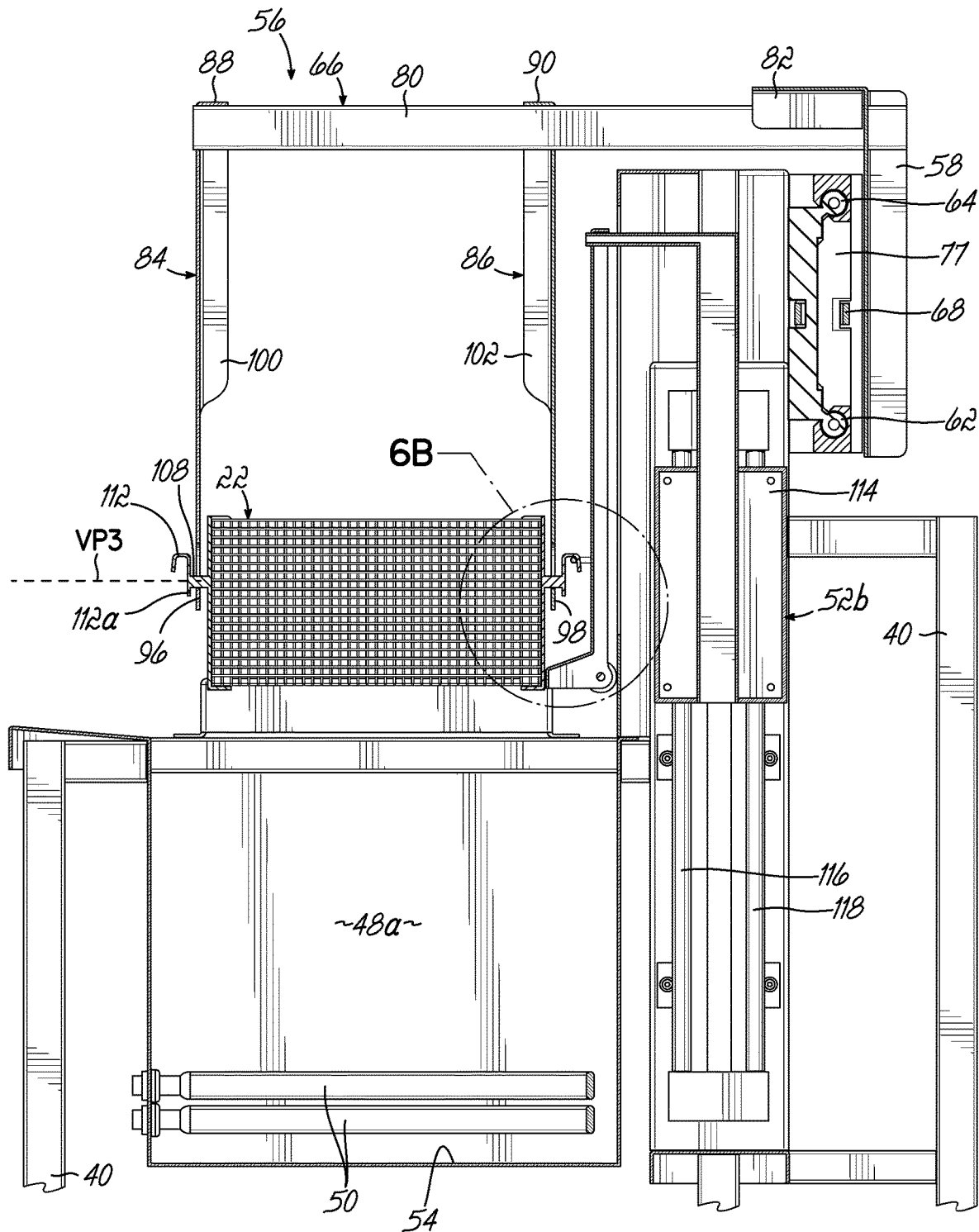
FIG. 5C is a partial cross-sectional side view like FIG. 5A, showing the basket coupled to the second vertical transport assembly at a third vertical position.

FIGS. 5A-5C describe how the second vertical transport assembly 52b moves the basket 22 between a plurality of vertical positions, such as a first vertical position ("VP1") shown in FIG. 5A, a second vertical position ("VP2") shown in FIG. 5B, and a third vertical position ("VP3") shown in FIG. 5C.

FIG. 5A shows the basket 22 coupled to the second vertical transport assembly 52b at the first vertical position, where the basket 22 is at least partially submerged within the cooking medium. This first vertical position, also considered a home position, is designed to keep the basket 22 at or near the temperature of the cooking medium when not actively in use. While not shown, the first vertical position may be slightly above the cooking medium, if desired. The engaging mechanism, such as a handle 104 according to an exemplary embodiment, of the second vertical transport assembly 52b engages the rear receiving mechanism, such as a rear downwardly facing hook 106, of the basket 22. Any suitable engaging mechanisms and rear receiving mechanisms are envisioned. The receiving mechanisms may be generally cylindrical rod members, for example.

As shown in FIGS. 5A-5C, the body 114 of the second vertical transport assembly 52b is configured to move vertically along first and second rods 116, 118 as described above with connection to FIG. 11. To this end, the body 114 is connected to the plate 77 that moves with the belt 68 as previously described in detail for the horizontal transport assembly 56 in FIG. 10. Persons skilled in the art would appreciate that the vertical transport assemblies 52a-52d may be fastened to the fryer 12 using any suitable method (such as by screw fasteners as shown in FIGS. 5A-5C). As shown, the vertical transport assemblies 52a-52d include body portions 120a, 120b, 120c, 120d that may be submerged into the respective cooking chambers 48a, 48b. As shown in FIGS. 5A-5C, the body portion 120b of the second vertical transport assembly 52b includes a roller 122 that moves along the surface of the first cooking chamber 48a. For the sake of clarity with this description, the basket 22 includes a top side 124, a bottom side 126, a front side 128, a rear side 130, a left side 132, and a right side 134.

Figure 6A:
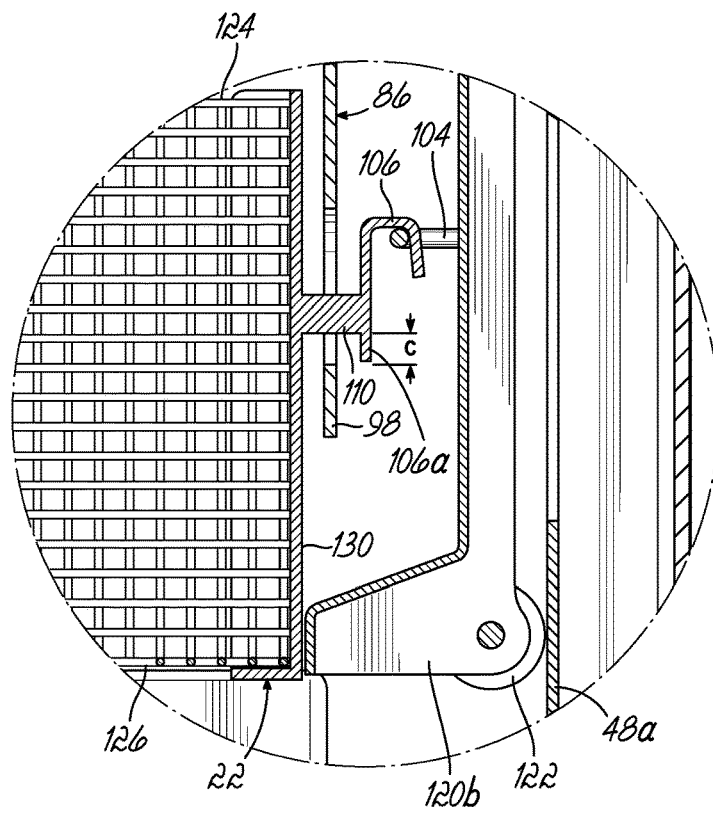
FIG. 6A is a detailed view of the detailed portion 6A shown in FIG. 5B that shows the interaction between the rear receiving mechanism of the basket and the engaging mechanism of the second vertical transport assembly in the second vertical position.

FIG. 5B, and its corresponding detailed view in FIG. 6A, show the basket 22 coupled to the second vertical transport assembly 52b at the second vertical position after being raised upward from the first vertical position. As a result, the second vertical position is located above the first vertical position. While the second vertical position is shown as being the highest vertical position of the second vertical transport assembly 52b, this is not required, and the second vertical transport assembly 52b may proceed higher if desired.

As shown in FIG. 6A, once the second vertical transport assembly 52b is at the second vertical position, the horizontal transport assembly 56 may move horizontally underneath the basket 22 in preparation for a hand-off. As used herein, a "hand-off" is intended to describe when the basket 22 is passed from the vertical transport assembly 52a-52d to the horizontal transport assembly 56 or when the basket 22 is passed from the horizontal transport assembly 56 to the vertical transport assembly 52a-52d. As shown in FIG. 6A, there is a clearance distance ("C") between the rear hook 98 and the rear rod 110 enabling the horizontal transport assembly 56 to move horizontally underneath the basket 22.

Figure 6B:
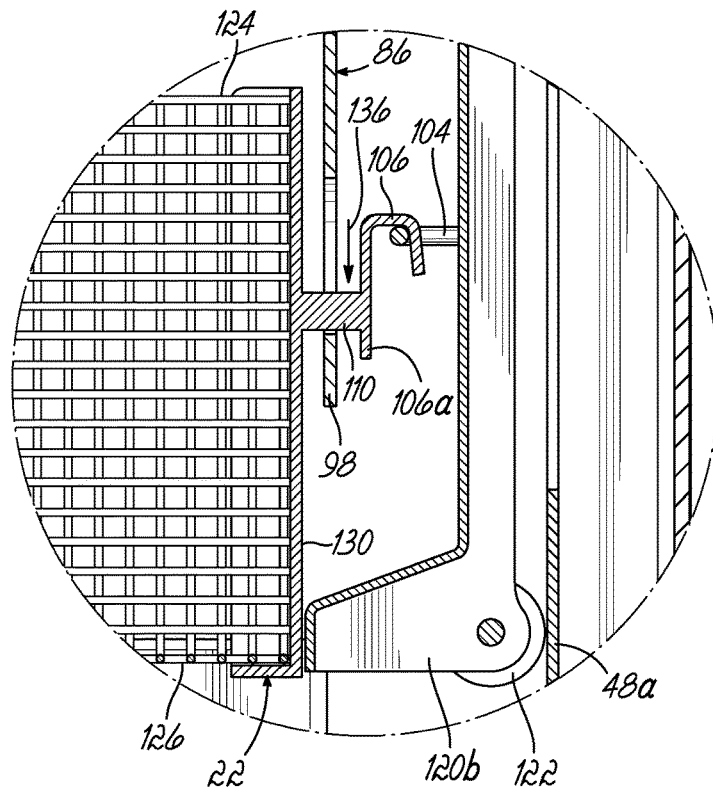
FIG. 6B is a detailed view of FIG. 5C showing the detailed portion 6B illustrating the interaction at the hand-off between the rear receiving mechanism of the basket and the engaging mechanism of the second vertical transport assembly in the third vertical position.

With reference to FIGS. 6A and 6B, the horizontal transport assembly 56 includes a first securing mechanism, such as the front hook 96 according to an exemplary embodiment, that is configured to selectively engage with a front receiving mechanism, such as the front rod 108 according to an exemplary embodiment, located on a front side 128 of the basket 22. Similarly, the horizontal transport assembly 56 includes a second securing mechanism, such as the rear hook 98 according to an exemplary embodiment, that is configured to selectively attach with a rear receiving mechanism, such as the rear rod 110 according to an exemplary embodiment, located on a rear side 130 of the basket 22. The front and rear hooks 96, 98 continuously maintain at least two points of contact with the basket 22 using the front and rear rods 108, 110, thereby allowing the basket 22 to pivot in a controlled, predictable manner when desired. Any suitable securing mechanisms and receiving mechanisms are envisioned, such that the interaction between the securing mechanisms and receiving mechanisms provide two points of contact with the basket 22 and allow the basket 22 to controllably pivot when desired.

As shown in the embodiment depicted in the Figures, the front rod 108 of the basket 22 includes a front downwardly facing hook 112 that enables the basket 22 to be used in a manual mode as discussed below. Similarly, the rear rod 110 of the basket 22 includes a rear downwardly facing hook 106 that enables the basket 22 to attach to the second vertical transport assembly 52b. Additionally, the rear downwardly facing hook 106 may include a projection 106a to prevent unintentional disengagement from the rear hook 98. Likewise, the front downwardly facing hook 112 may include a projection 112a to prevent unintentional disengagement from the front hook 96.

FIG. 5C, and its corresponding detailed view in FIG. 6B, show the basket 22 coupled to the second vertical transport assembly 52b at the third vertical position, which is located between the first and second vertical positions. The third vertical position allows the front rod 108 that is fixably attached to the front side 128 of the basket 22 to drop into the front hook 96, and the rear rod 110 that is fixably attached to the rear side 130 of the basket 22 to drop into the rear hook 98 as the second vertical transport assembly 52b moves downward along the direction of arrow 136. The second vertical transport assembly 52b continues to move downward until it no longer is in contact with the basket 22, thereby completing the hand-off.

Figure 7A:
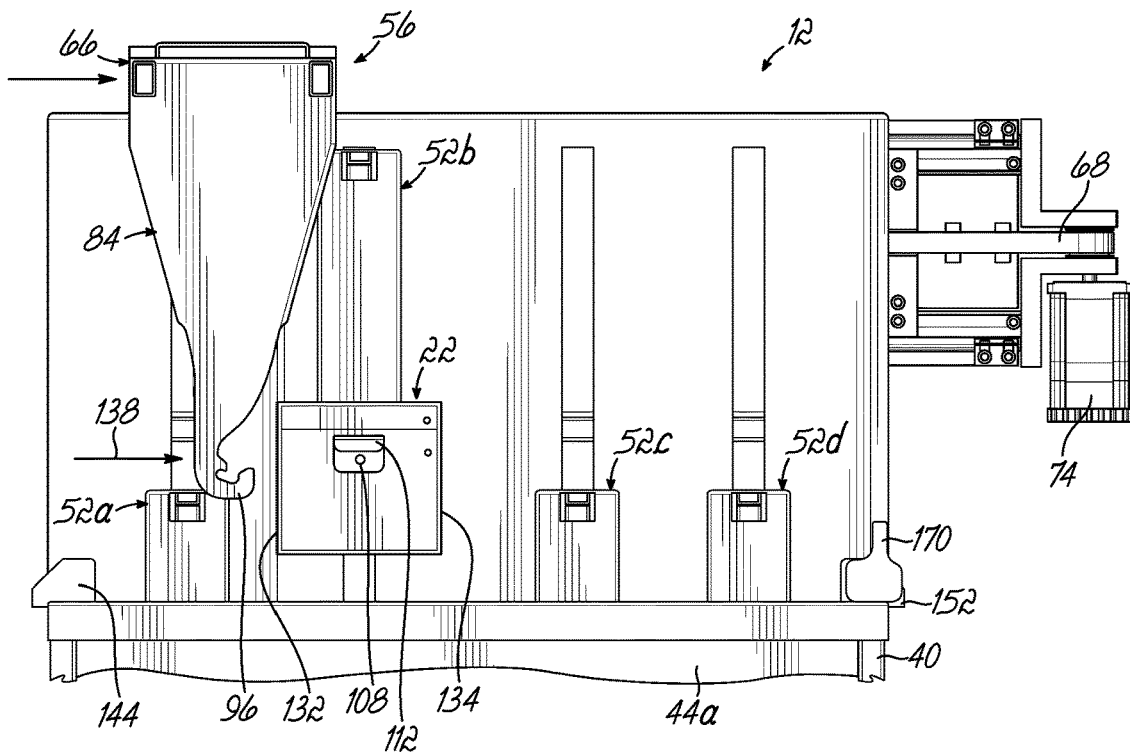
FIG. 7A is a front view of the fryer shown in FIG. 6A, with the basket in the second vertical position and the horizontal transport assembly approaching the basket.

FIGS. 7A-J show a series of front views illustrating the movement of the horizontal transport assembly 56 of the fryer 12 in order to manipulate a basket 22 between multiple positions at the fryer 12, according to an exemplary embodiment. FIG. 7A shows a front view of the fryer 12 of FIG. 5A, with the basket 22 in the second vertical position and the horizontal transport assembly 56 approaching the basket 22 from the left side along the direction of arrow 138.

Figure 7B:
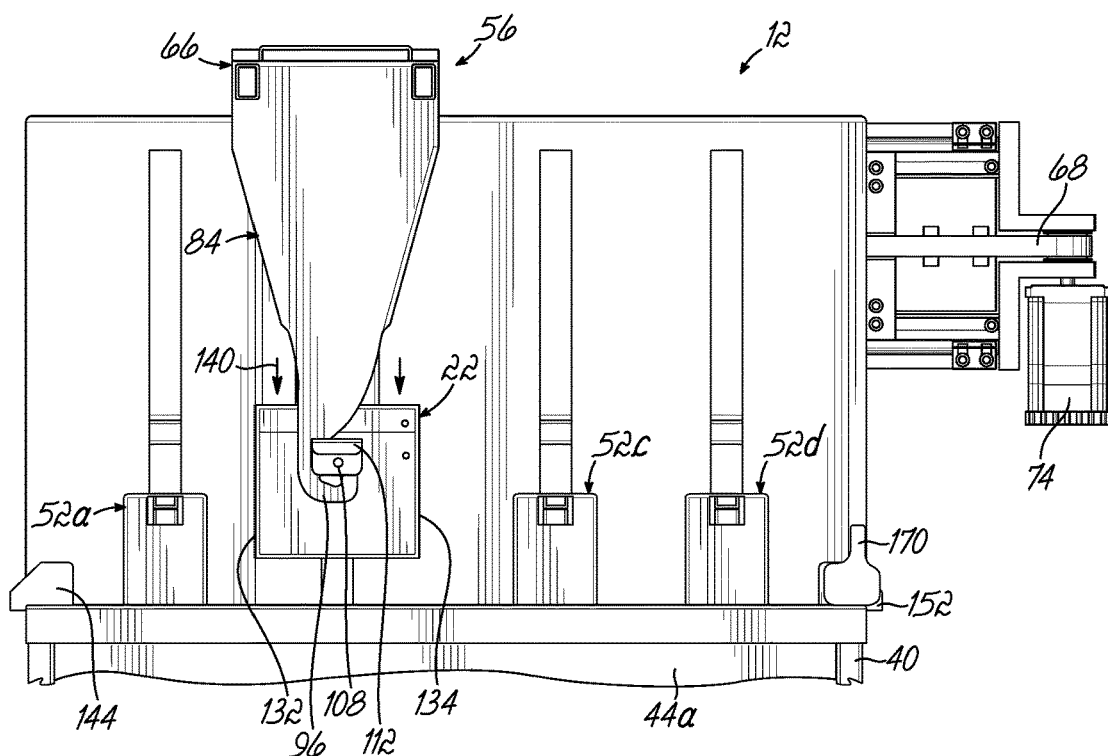
FIG. 7B is a front view of the fryer shown in FIG. 6B, with the basket moving from the second vertical position to the third vertical position.

FIG. 7B shows a front view like the side view of FIG. 5B, with the second vertical transport assembly 52b beginning to move the basket 22 from the second vertical position to the third vertical position along the direction of arrow 140, after the horizontal transport assembly 56 has moved the front and rear hooks 96, 98 under the corresponding structure on the basket 22. This movement hands off the basket 22 from the vertical transport assembly 52b to the horizontal transport assembly 56.

Figure 7C:
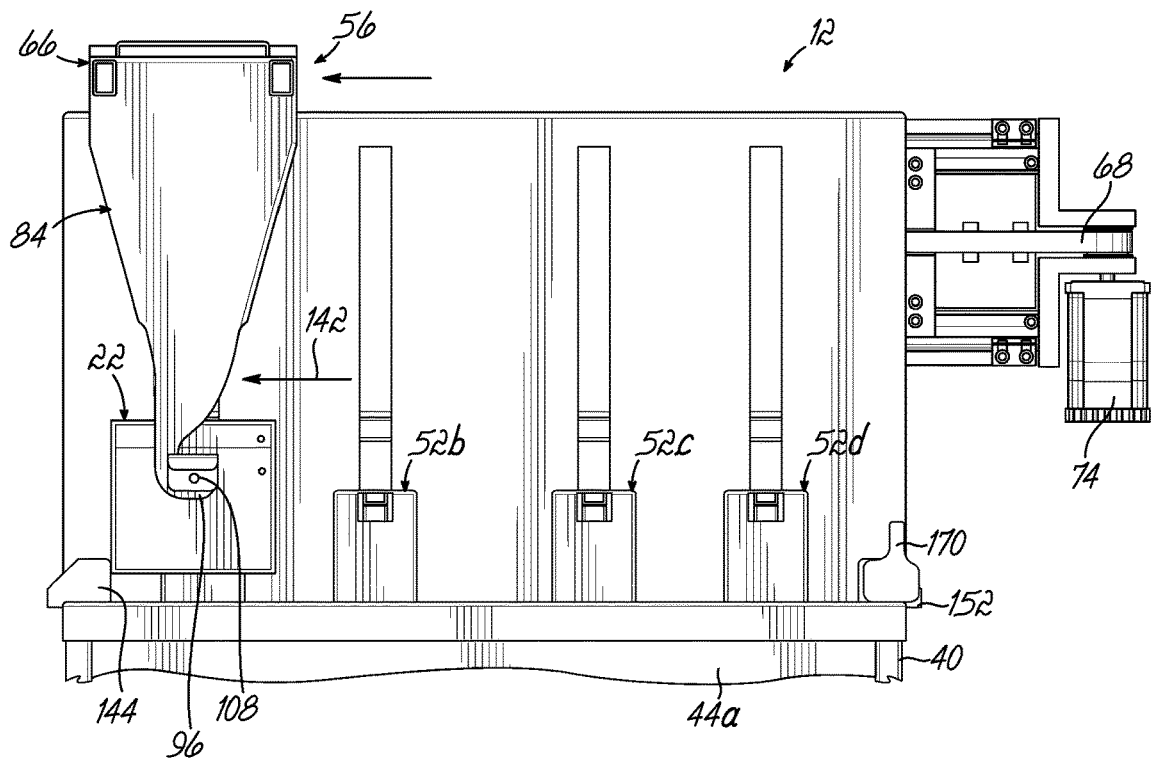
FIG. 7C is a front view of the fryer with the horizontal transport assembly moving the basket towards the freezer.

FIG. 7C shows the horizontal transport assembly 56 moving the basket 22 laterally towards the freezer 14 along the direction of arrow 142, until the left side 132 of the basket 22 contacts a wedge 144, which is rigidly attached to the fryer 12.

Figure 7D:
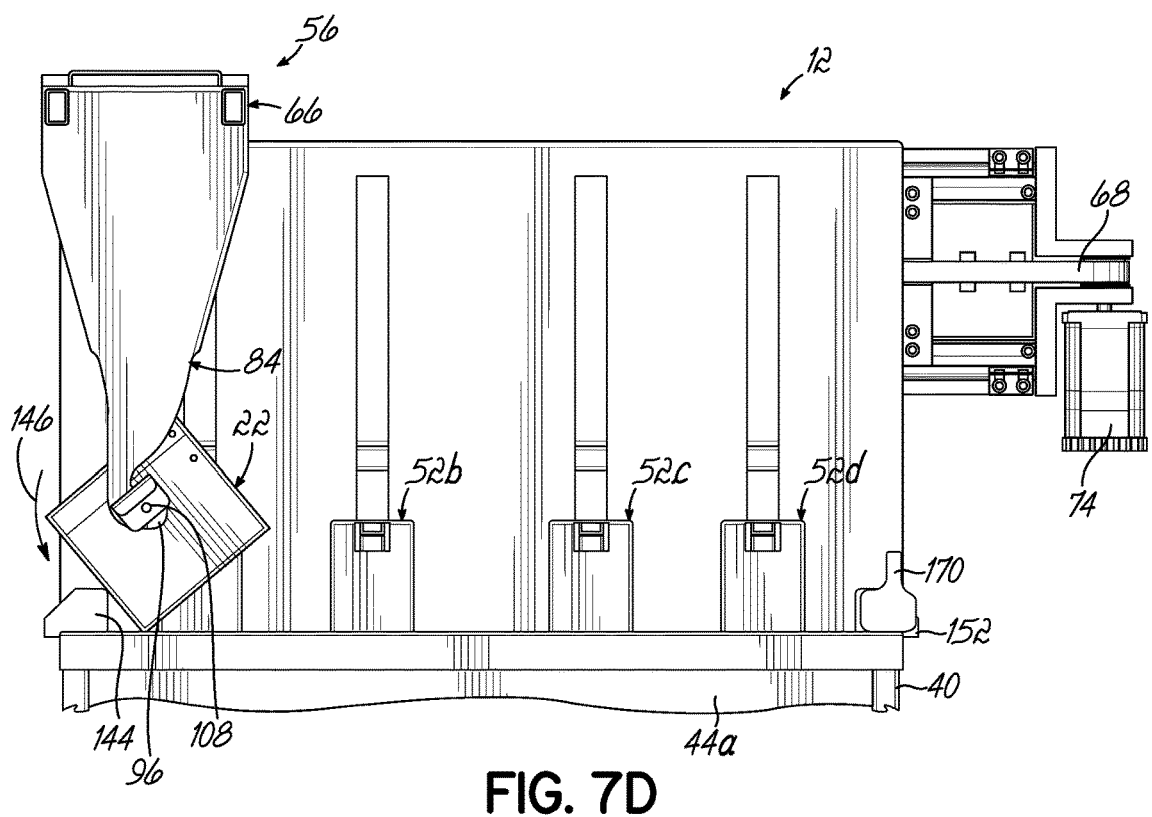
FIG. 7D is a front view of the fryer with the horizontal transport assembly pivoting the basket to receive the food product from the freezer.

FIG. 7D shows the horizontal transport assembly 56 pivoting the basket 22 to receive food product from the freezer 14. The front and rear hooks 96, 98 secure the basket 22 during horizontal movement and are configured to allow for the tilting of the basket 22 (caused by further movement of the basket 22 against the wedge 144, which forces the pivotal movement) while receiving food product from the freezer 14 without use of an additional motor or an additional hand-off. To this end, the basket 22 further contacts the wedge 144 to pivot the basket 22 and receive contents from the freezer 14 along the direction of arrow 146. The basket 22 pivots about the axis shown in FIG. 5C labeled VP3. While FIG. 7D shows the basket 22 tilting as the basket 22 is receiving food product from the freezer 14, the basket 22 may remain completely vertically upright receiving food product from the freezer or storage device, if desired, and the wedge 144 could be omitted in those alternative embodiments.

Figure 7E:
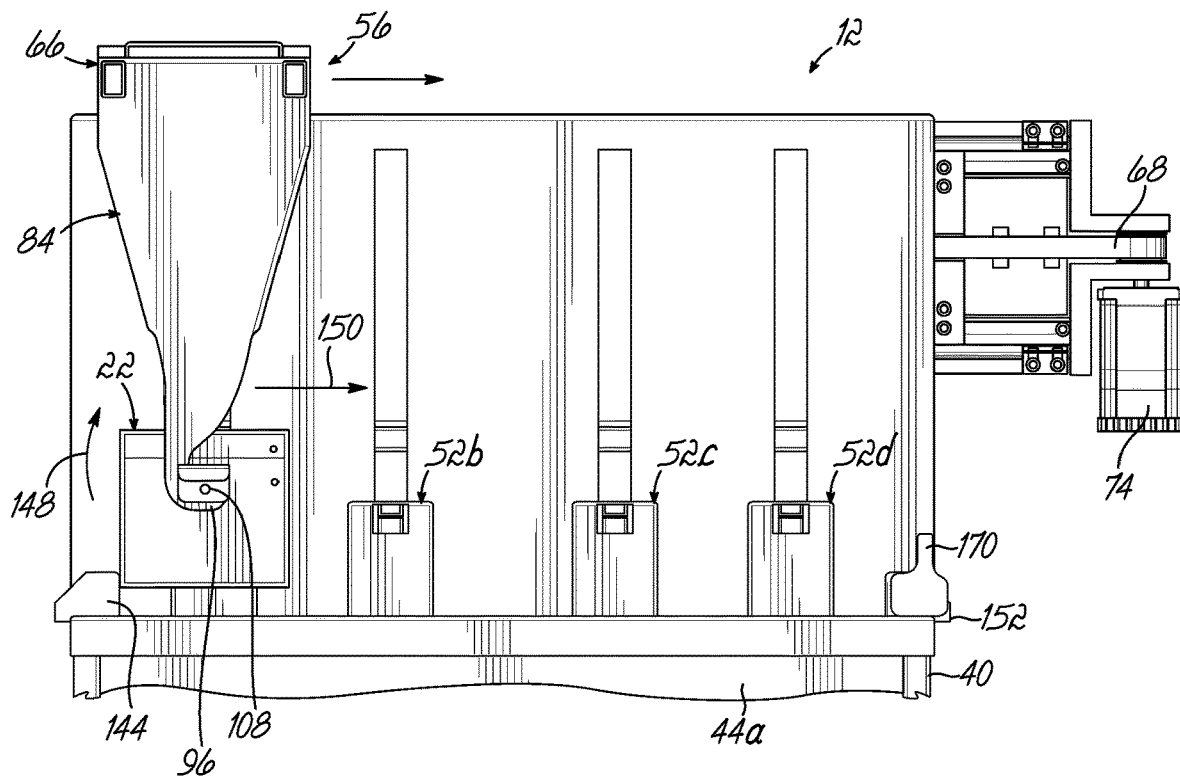
FIG. 7E is a front view of the fryer with the horizontal transport assembly pivoting the basket in the opposite direction after receiving the food product from the freezer.

FIG. 7E shows the horizontal transport assembly 56 pivoting the basket 22 in the opposite direction after receiving food product from the freezer 14 to the upright position along the direction of arrow 148. The horizontal transport assembly 56 then moves the basket 22 laterally along the direction of arrow 150.

Figure 7F:
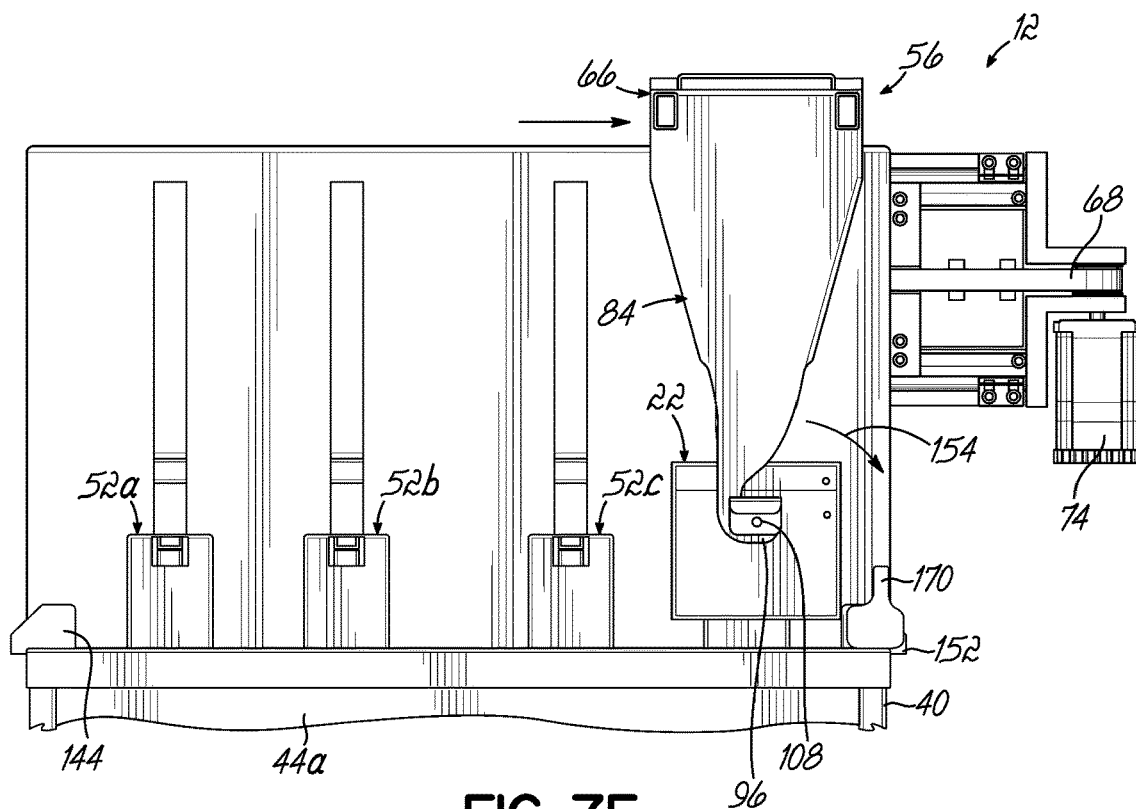
FIG. 7F is a front view of the fryer with the horizontal transport assembly moving the basket towards the hot holding station after cooking the food product.

Between FIGS. 7E and 7F, the horizontal transport assembly 56 moves the basket 22 laterally from the freezer 14 to above the first cooking chamber 48a. During this time of travel, the basket 22 is at the third vertical position shown and described in FIGS. 5C and 6B. The second vertical transport assembly 52b then moves upward and contacts the basket 22, raising the basket 22 to the second vertical position as shown and described in FIGS. 5B and 6A. As previously described, the handle 104 of the second vertical transport assembly 52b raises the rear downwardly facing hook 106 of the basket 22, so that the basket 22 is no longer in contact with the front and rear hooks 96, 98 that secure the basket 22 during horizontal movement. The horizontal transport assembly 56 then moves laterally away from the basket 22 (e.g., moving the front and rear hooks 96, 98 out from underneath the second vertical transport assembly 52b), thereby completing the hand-off. The second vertical transport assembly 52b then moves the basket 22 downward into the first cooking chamber 48a as described in FIG. 5A. As a result, the food product within the basket 22 begins to cook.

While the basket 22 is cooking, the automated cooking system 10 may coordinate with the other vertical transport assemblies 52a-52d and horizontal transport assembly 56 to move another basket 22 to the desired location such that multiple baskets 22 may be in use simultaneously. This helps to increase the throughput of the cooked food product. For example, a third vertical transport assembly 52c may raise and hand-off the basket 22 to the horizontal transport assembly 56 which may then move the basket 22 to the freezer 14 as previously described and move the basket 22 from the freezer 14 to the desired cooking location, such as the second cooking chamber 48b using the third vertical transport assembly 52c. Alternatively, or in addition to, the horizontal transport assembly 56 may take another basket 22 out of the respective cooking location and dump the cooked food product, as shown and described in greater detail below.

After cooking, the second vertical transport assembly 52b may move slightly upward from the first cooking chamber 48a, to no longer be submerged in the cooking medium, thereby allowing the food product in the basket 22 to drip dry. The second vertical transport assembly 52b then moves upward to raise the basket 22 to the second vertical position as shown and described in FIGS. 5B and 6A. The horizontal transport assembly 56 then moves laterally under the basket 22. The second vertical transport assembly 52b then moves downward so that the basket 22 is in the third vertical position shown and described in FIGS. 5C and 6B, thereby completing the hand-off to the horizontal transport assembly 56.

FIG. 7F shows the horizontal transport assembly 56 moving the basket 22 towards the hot holding station 16 after cooking the food product in the basket 22 of the fryer 12. As shown, the basket 22 contacts a wedge 152 to pivot the basket 22 to the hot holding receiving area 28 along the direction of arrow 154. Once again, the front and rear hooks 96, 98 continuously provide two points of contact that reliably retain the basket 22 during the pivotal movement caused by moving the basket 22 against the wedge 152.

Figure 8:
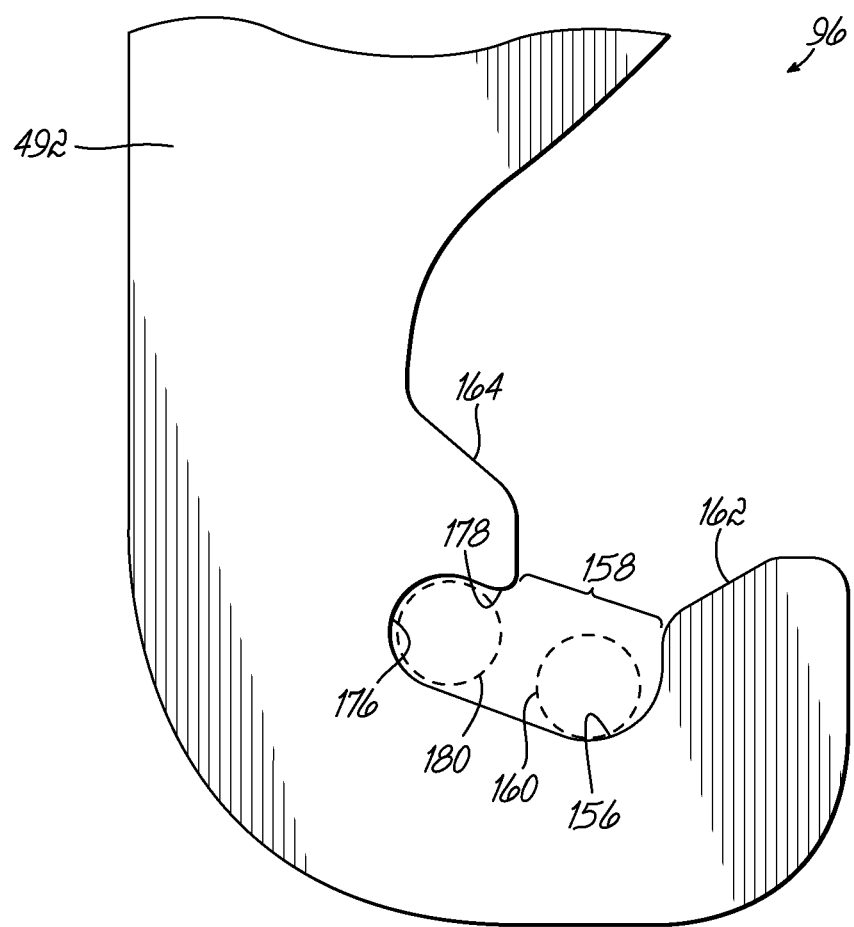
FIG. 8 is a detailed front view of a hook of the horizontal transport assembly according to an exemplary embodiment of the invention.

It is beneficial to describe the front and rear hooks 96, 98 in further detail at this time. FIG. 8 shows a detailed front view of the front hook 96 of the horizontal transport assembly 56. As shown in FIG. 8, the front hook 96 includes a receiving portion 156 that is located below a throat portion 158 that forms an opening in the front and rear hooks 96, 98. As shown in FIG. 8, the front and rear hooks 96, 98 also include beveled surfaces 162, 164 to help guide the basket 22 into the proper position. While not shown, it is to be understood that the rear hook 98 may be the same as the front hook 96. In FIG. 7F, the front and rear rods 108, 110 are located at the receiving portion 156, as shown in FIG. 8 using dashed lines 160.

Figure 7G:
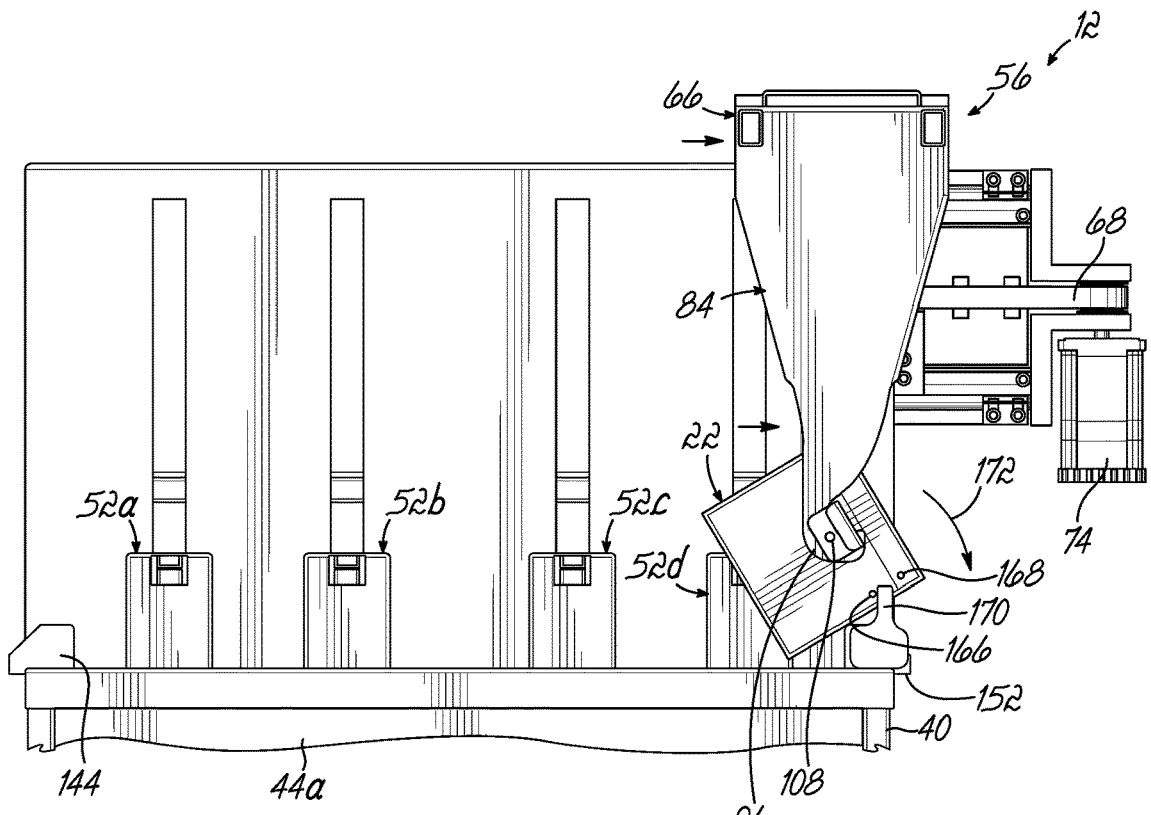
FIG. 7G is a front view of the fryer with the horizontal transport assembly pivoting the basket towards the hot holding station.

FIG. 7G shows the horizontal transport assembly 56 pivoting the basket 22 towards the hot holding station 16. The front and rear hooks 96, 98 secure the basket during horizontal movement and are configured to allow the basket 22 to tilt while removing the food product from the basket 22 into the hot holding station 16, without the use of an additional motor or hand-off. The basket 22 includes first and second tilting mechanisms located on each of the front and rear sides 128, 130 of the basket 22 that are configured to interact with a tilting mechanism forming part of the wedge 152 of the fryer 12. As shown, the first and second tilting mechanisms include first and second pegs 166, 168 rigidly coupled to the basket 22, and the tilting mechanism includes a curvilinear shaped plate 170 that interacts with the first and second pegs 166, 168 of the basket 22, in cam and follower relationship. As shown in FIG. 7G, the first peg 166 is in sliding contact with the curvilinear shaped plate 170 as the basket rotates along the direction of arrow 172. In FIG. 7G, the front and rear rods 108, 110 are still located at the receiving portion 156 as shown in FIG. 8 using dashed lines 160.

Figure 7H:
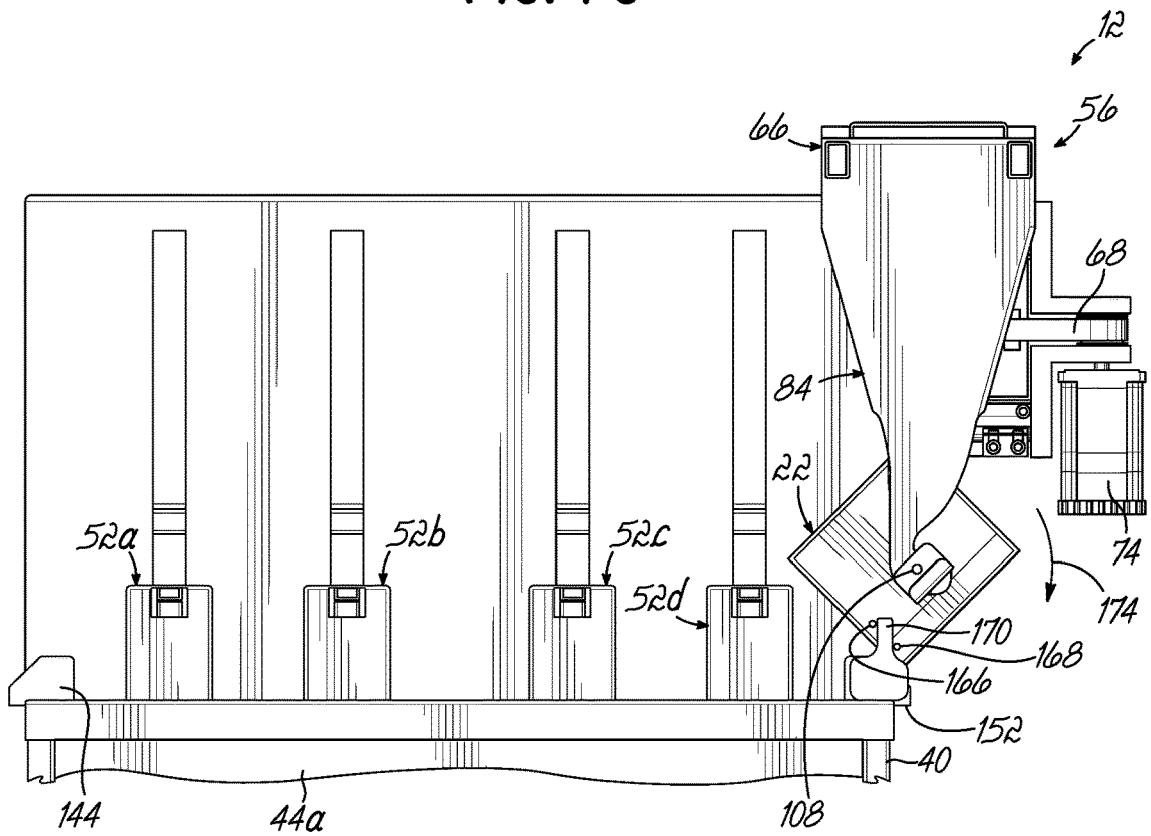
FIG. 7H is a front view of the fryer with the horizontal transport assembly further pivoting the basket to dump the cooked food product into the hot holding station.

FIG. 7H shows the horizontal transport assembly 56 further pivoting the basket 22 to dump the cooked food product in the hot holding station 16 along the direction of arrow 174. Each of the front and rear hooks 96, 98 includes a locking portion 176 bounded on three sides by walls of the hook and is configured to provide a locked position for tilting of the basket 22. A projection 178 also keeps the front and rear rods 108, 110 in the proper position. As a result, in FIG. 7H, the front and rear rods 108, 110 are now located at the locking portion 176 as shown in FIG. 8 using dashed lines 180. FIG. 7H shows that the first and second pegs 166, 168 of the front side 128 of the basket 22 are in sliding contact with the curvilinear shaped plate 170. While not shown, the first and second pegs 166, 168 of the rear side 130 of the basket 22 may also be in sliding contact with the curvilinear shaped plate 170.

Figure 7I:
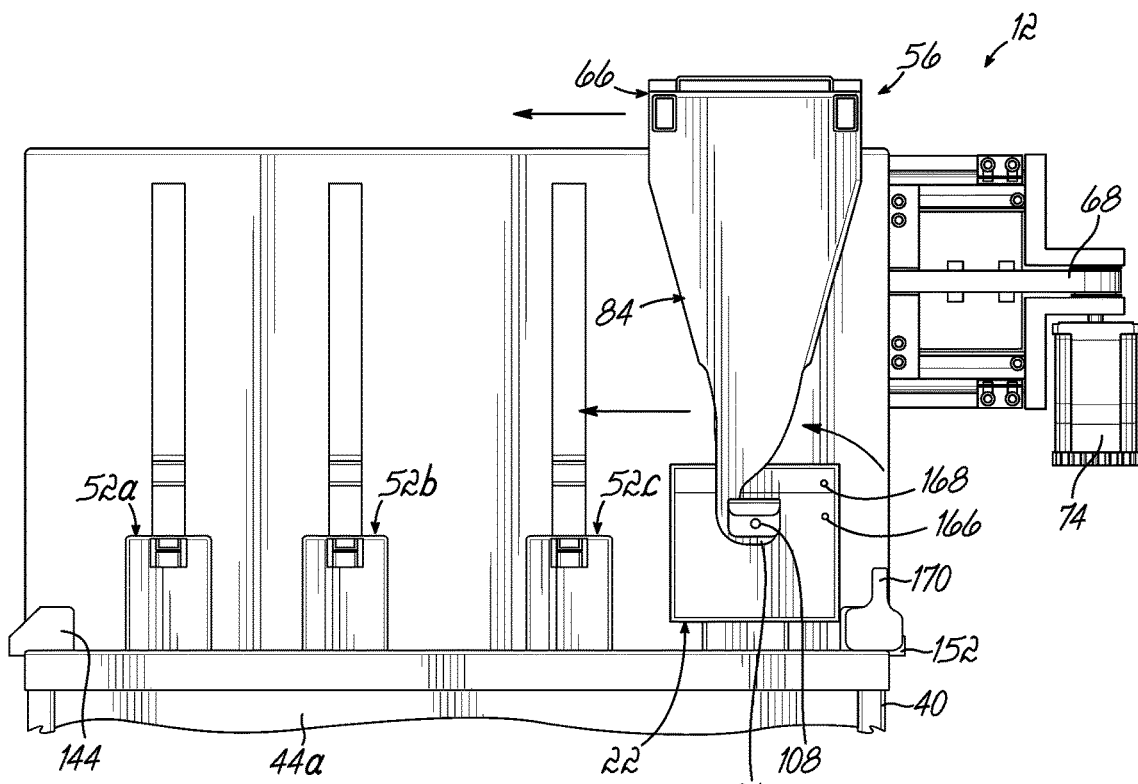
FIG. 7I is a front view of the fryer with the horizontal transport assembly pivoting the basket away from the hot holding station after dumping the cooked food product.

FIG. 7I shows the horizontal transport assembly 56 pivoting the basket 22 away from the hot holding station 16 after dumping the cooked food product in the hot holding station 16. The horizontal transport assembly 56 moves laterally in the opposite direction from the hot holding station 16, where once the first and second pegs 166, 168 of the basket 22 slide to be released from engagement with the curvilinear shaped plate 170, the basket 22 pivots to the upright position. At this point, the horizontal transport assembly 56 may move the basket 22 back to the freezer 14 to accept more product, thereby repeating the process. Alternatively, the horizontal transport assembly 56 may move the basket 22 to another location, such as the position above or within the cooking medium.

Figure 7J:
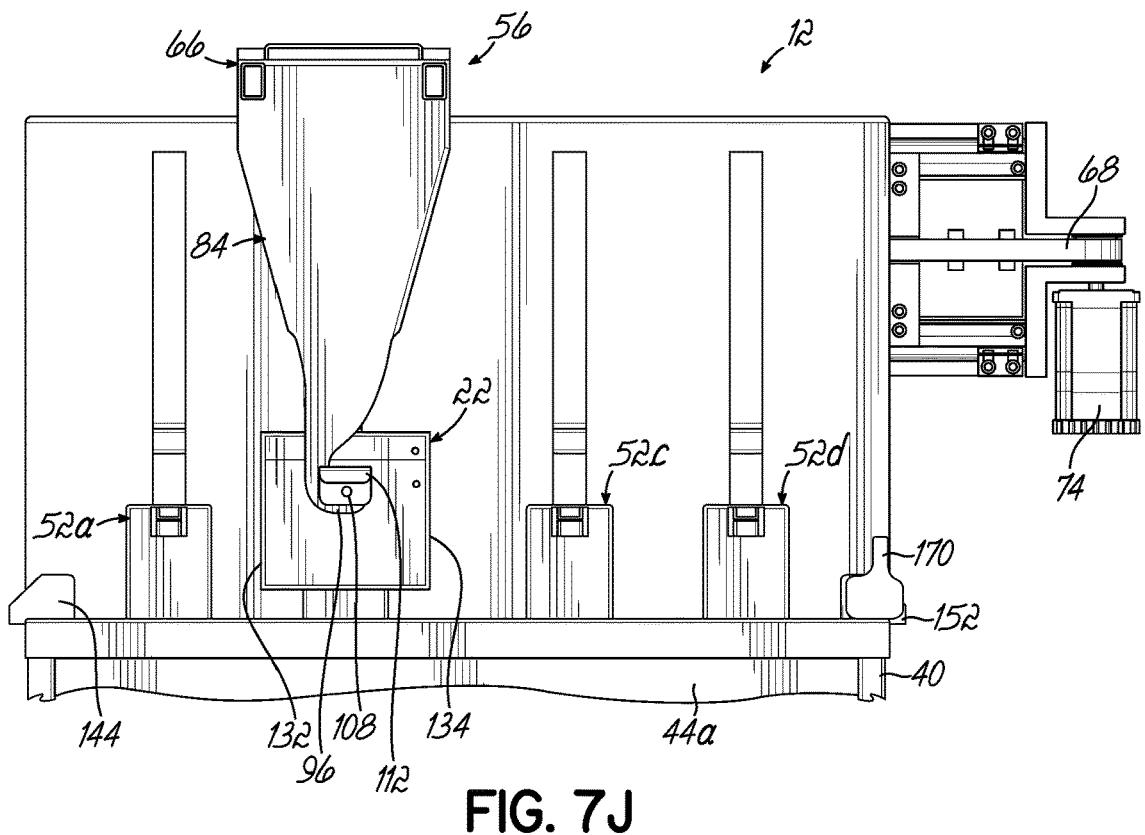
FIG. 7J is a front view of the fryer shown in FIG. 6B with the horizontal transport assembly holding the basket in the third vertical position prior to being engaged by the second vertical transport assembly.

FIG. 7J shows a front view of the fryer 12, which is like the side cross-sectional view of FIG. 6B, with the horizontal transport assembly 56 holding the basket 22 in the third vertical position prior to being engaged by the second vertical transport assembly 52*b*. The horizontal transport assembly 56 continues to move laterally from the hot holding cabinet to above the cooking chamber. The second vertical transport assembly 52*b* moves upward to raise the basket 22 to the uppermost position. The horizontal transport assembly 56 then moves laterally away from the basket 22, completing the hand-off. The second vertical transport assembly 52*b* then lowers the basket 22 back to the first vertical position ("home position"), where the basket 22 is within the cooking medium. Each of these steps in the sequence of FIGS. 7A-7J can be repeated to automatically move baskets 22 between stations and thereby manage the cooking process.

Figure 9:
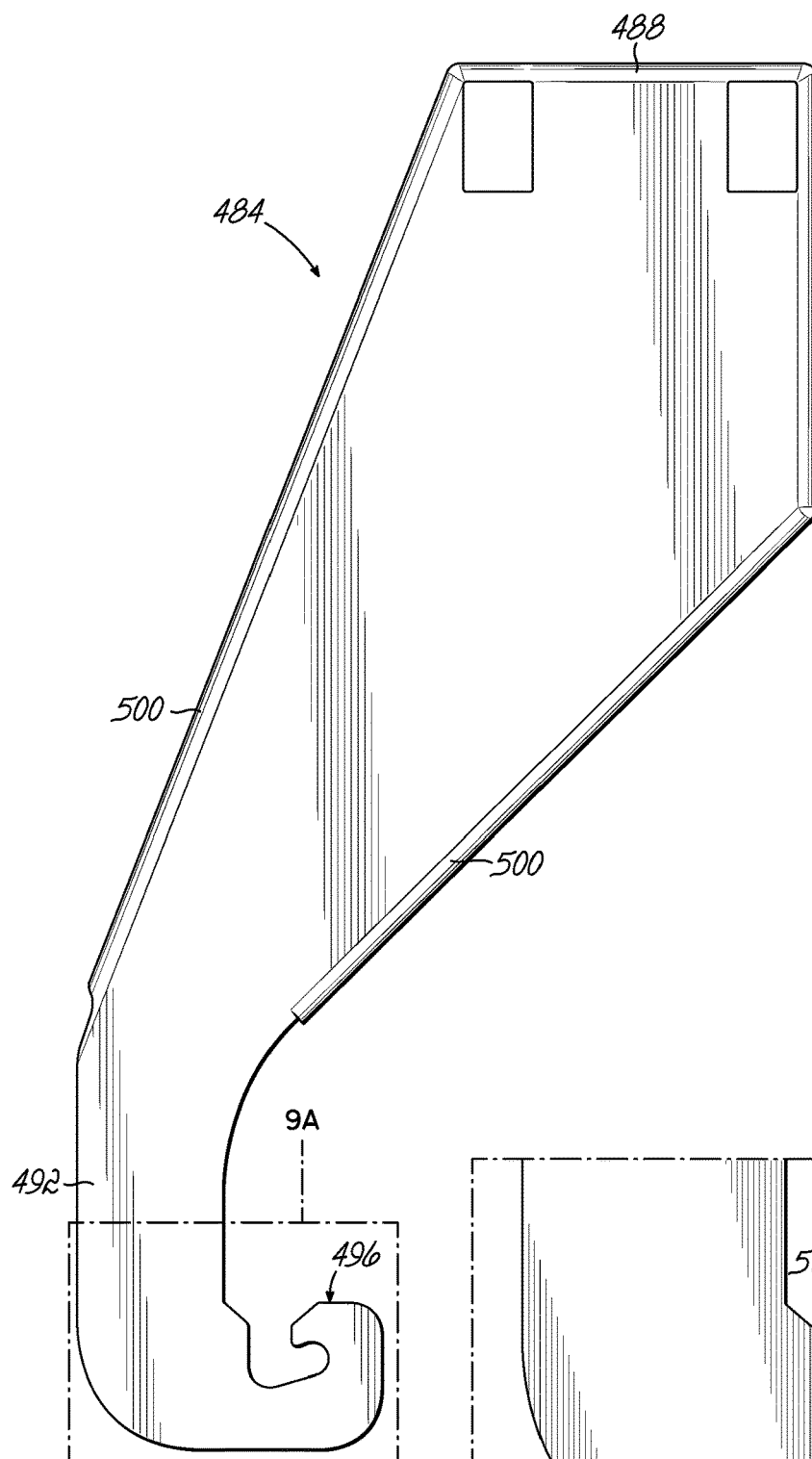
FIG. 9 is a front view of the front arm of a horizontal transport assembly in accordance with another embodiment of the invention.
Figure 9A:
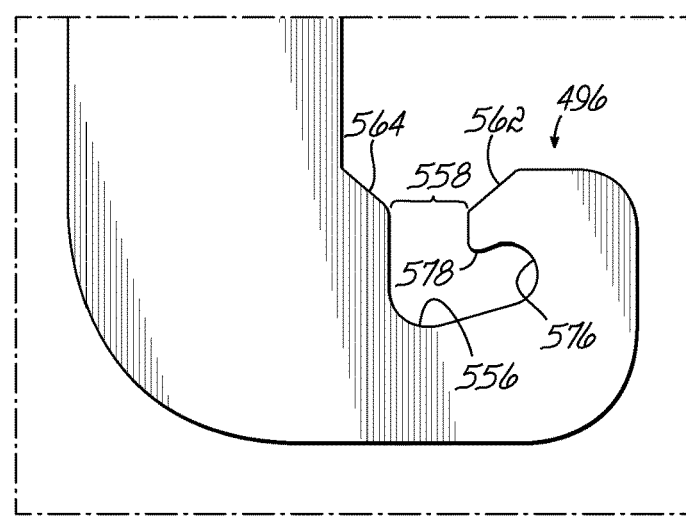
FIG. 9A is a front view of the detailed portion 9A of the front hook shown in FIG. 9.

Now with reference to FIG. 9, a front arm 484 is shown according to another exemplary embodiment. The front arm 484 includes many of the same elements as the previously described embodiment (front arm 84), and these elements have been provided with similar reference numbers in the 400 and 500 series where the elements are substantially similar or identical to those previously described. For example, the front arm 484 of this embodiment again includes upper portion 488, lower portion 492, front hook 496, flange portion 500, receiving portion 556, and throat portion 558, beveled surface 562, beveled surface 564, locking portion 576, and projection 578. Although many of these elements have slightly modified shapes or profiles in this embodiment, the front arm 484 and its elements function as described above except where the differences are outlined in further detail below (the detailed description of these identical or substantially similar elements is largely not repeated herein for the sake of brevity). In this embodiment, the angle of the front arm 484 enables greater space savings, such that the front arm 484 does not interfere with an operator located at the hot holding station 16. While not shown, it is to be understood that the rear arm may be the same as the front arm 484. In all other respects, the front arm 484 operates in a similar manner as the one described above.

A method of using the fryer in manual mode allowing the at least one cooking chamber 48*a*, 48*b* to be used when at least one of the vertical transport assembly 52*a*-52*d* or the horizontal transport assembly 56 is non-operational. The fryer 12 may include a manual override switch with a timer in case the automated system 10 fails for some reason, or an operator desires to operate the system 10 in manual mode as opposed to automatic mode. If there is some type of failure of any one of the actuating systems, it is easy for an operator to return to the conventional manual mode, in other words, resorting to current operating procedure. If the failure is isolated to a single basket 22 position, the operator may choose to disable that position and the automated system 10 will automatically schedule cooking around that basket 22.

Thus, the system 10 and/or fryer 12 can cook a high volume of food products in a relatively small space. For example, the fryer 12 may be sized to fit in an area of a restaurant previously occupied by a traditional open fryer and vented by a hood sized for the previous fryer. Therefore, the fryer 12 may be inserted into such a space without requiring the restaurant to undergo significant renovations, replace previously installed hoods, and/or sacrifice additional space. In this regard, the fryer 12 may be considered a "plug and play" fryer and may be easily incorporated into all types of existing kitchen and restaurant configurations, allowing the benefits of high volume cooking to be achieved by a wide variety of restaurant operators and their customers.

By dispensing uncooked food product from the freezer 14 into the basket of the fryer 12 and subsequently dispensing the cooked food product from the basket into the hot holding station 16, the system 10 provides for a substantially automated cooking of food product with little to no human intervention. In this regard, the fryer 12 may include a continuous oil filtration system to further decrease the amount of human intervention required to operate the system 10. In addition, or alternatively, uncooked food product may be dispensed into the basket of the fryer 12 from a source other than the freezer 14 and/or by human placement of the food product into the fryer 12.

Interfacing with a touch-screen control according to an exemplary embodiment, the operator selects the quantity of food product and the repeating rate upon which they wish to cook, and the automated cooking system 10 automatically optimizes the dispensing schedule and where to perform the cooking. The automated cooking system 10 automatically raises the predetermined basket 22, moves the basket 22 to the position to accept the uncooked food product, moves the basket to the proper cooking chamber location, lowers the basket 22 into the cooking medium, raises the basket 22 once cooked and moves the basket 22 to be dispensed into the hot holding area, and moves the basket 22 back to a predetermined location (such as within the cooking medium) or to accept more uncooked food product.

Many benefits may arise through use of the automated cooking system 10. The automated cooking system 10 allows the operator to perform other tasks while the automated cooking system 10 is working. Additionally, an automated system 10 allows for improved quality control of the product (e.g. precise cooking time, more precise weight of product being cooked, optimized heat management by alternating product drops between the various cooking chambers, and/or synchronized mini-filtration during idle periods). Additionally, the automated cooking system 10 increases the maximum hourly product throughput versus a manually-operated system. Additionally, the automated cooking system 10 provides superior up-time and predictive fault diagnostics due to continual baseline performance comparisons and configurable warning thresholds.

Additional benefits of the automated cooking system 10 include, for example, an improved operator experience, availability of manual override at any point of the process, easy cleaning (typical cooking chamber cleaning procedure where the actuator surfaces can be easily wiped down), the system fits into customer's current fryer width footprint; the overhead gantry 66 fits under the 64 inch minimum hood clearance, minimal interference with existing fire suppression systems due to cantilevered design of the horizontal transport assembly 56 making retrofit and site approvals easier, moving parts and controls being shielded from operator and extreme heat, optimized motions allowing for minimal speeds to reduce risk of operator contact, and being retrofittable to existing fryers.

As described herein, various components of the fryer 12 are exposed to oil during cooking operations. Therefore, any or all these components may be constructed of a highly corrosion resistant material such as, for example 304 SST. In addition, or alternatively, various covers and/or safety guards (not shown) may be positioned over at least a portion of the fryer 12.

In one embodiment, the system controller 200 may be configured to implement different modes of the system 10 and/or fryer 12. In any event, the system controller 200 may be operatively coupled to a dispensing mechanism of the freezer 14 to enable coordination between the dispensing of uncooked food product from the freezer 14 onto the basket 22, such that a predetermined amount of food product is dispensed into the basket 22. The system controller 200 may also interface with other equipment in a fully automated fashion, to cause cooking of food product in response to customer orders/demand. For example, an automated kitchen system is shown and described in International Application No. PCT/US2017/037273, filed on Jun. 13, 2017, which is expressly incorporated by reference in its entirety herein.

To this end, an automated kitchen system may be provided for fulfilling customer orders for cooked food products in a restaurant. The kitchen system includes several cooking devices such as fryers and at least one order receiving device that inputs the customer orders. In response to a demand level for food products based on the amount of customer orders, a control signal is sent to controllers of the multi-lane fryers and the controllers adjust the production rate of cooked food products to match the levels of demand for customer orders. An automated feed system provides uncooked food products into the fryers, and a heated conveyor system (or other automated product movement device) transports cooked food products to final preparation and packaging stations. Thus, no human contact or interaction with the food products is required until the final preparation and packaging process.

In accordance with one example embodiment, an automated kitchen system for fulfilling customer orders includes a feed system configured to store and deliver a supply of uncooked food products. The kitchen system also includes at least one cooking device operably connected to the feed system to receive the uncooked food products. The cooking device has a controller configured to vary a production rate of cooked food products made by the cooking device. A preparation and packaging station receives cooked food products from the at least one cooking device such that the cooked food products can be packaged for fulfilling the customer orders. The kitchen system further includes at least one order receiving device that collects the customer orders for cooked food products from customers. The order receiving device may include any of an ordering kiosk, a drive-thru communication device, a mobile software application, or the like. The order receiving device and the cooking device have closed loop interconnectivity such that control signals based on variations in levels of demand for customer orders are automatically sent to the controller of the at least one cooking device, and the controller of the at least one cooking device adjusts the production rate of cooked food products to match the levels of demand for customer orders.

To this end, the automated kitchen system may adapt production to the customer demand, specifically by using the controllers of the fryers to increase food production rates or decrease rates in accordance with the current demand. Order data (as well as other input data) from the cashier stations and other points of sale may be collected and tabulated in real time to determine an ideal level of production for the fryers and any other connected cooking equipment that may also be used in the kitchen system. The cashier stations or some other system controller then sends signals via wireless radiofrequency communication or a similar medium to the controllers of the fryers to change food production rates to match the ideal level currently calculated to be present. During a peak demand, the interconnectivity of the elements of the automated kitchen system assures that the system can meet the required production, to thereby avoid significant delays in delivering food orders to the customers. Moreover, the responsiveness of the automated kitchen system mimics a "just-in-time" delivery system without necessitating employee or human interaction and controls to adjust for varying demand levels.

It will be understood that the system 10 (including the overhead gantry basket movement) and system controller 200 described in this application can be integrated with such an automated kitchen system to provide cooked food products as needed to improve quality of food products delivered to consumers while also freeing up operator time to perform other actions and improve efficiencies/production levels in the kitchen.

The system controller 200 may include various other features for improving efficiencies of the system 10. In one embodiment, the system controller 200 may be configured to alternate activation of the heating elements in a particular oil cooking chamber via the heating element couplings. In this regard, the system controller 200 may selectively activate a portion of the heating elements (e.g., one heating element of a group in the oil cooking chamber while leaving the remaining portion, e.g., three heating elements, of the group inactive). After allowing the activated portion to remain active for a predetermined/optimal time, the system controller 200 may deactivate this portion and selectively activate a portion of the remaining heating elements. By alternating activation of the heating elements, the inactive or deactivated heating elements may be conserved thereby increasing the usable life of the heating elements and associated heating element couplings. The system controller 200 may perform this selective activation, for example, during periods of low product demand. In addition, or alternatively, the system controller 200 may be configured to respond to a failure of an active heating element by deactivating the failing heating element and/or activating an inactive heating element to avoid unwanted downtime.

In one embodiment, the system controller 200 may be configured to provide improved site power management by monitoring and/or managing the power usage of the fryer 12 and freezer 14. For example, the system controller 200 may deactivate and/or decrease the power consumption of one or more heating elements during periods when the freezer 14 may require an increase in power consumption, such as for performing a cooling cycle of the freezer 14. In another embodiment, the system controller 200 may be configured to perform predictive equipment health monitoring to provide information relating to the status of various components of the system 10 such as, for example, partial or full burnout of heating elements or failure of heating element couplings.

In general, the routines executed by the system controller 200 to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A method of heating a cooking medium in a fryer including a cooking chamber having a plurality of heating elements located therein, comprising:
   selectively activating a first portion of the plurality of heating elements while a second portion of the plurality of heating elements is inactive;
   selectively deactivating the first portion of the plurality of heating elements; and
   selectively activating the second portion of the plurality of heating elements while the first portion of the plurality of heating elements is inactive,
   wherein the fryer has a peak production rate of cooked food products, and the method selectively activates one of the first portion or the second portion of the plurality of heating elements while the other of the first portion or the second portion of the plurality of heating elements is inactive in response to a demand for the cooked food products being below the peak production rate of the cooked food products.

2. The method of claim 1, wherein the first portion and the second portion of the plurality of heating elements are selectively activated and deactivated so that the first portion and the second portion of the plurality of heating elements are activated alternatively.

3. The method of claim 1, wherein the first portion and the second portion of the plurality of heating elements are selectively activated and deactivated so that one of the first portion or the second portion of the plurality of heating elements is activated for a predetermined time before deactivating the one of the first portion or the second portion of the plurality of heating elements, and the other of the first portion or the second portion of the plurality of heating elements is activated for the predetermined time while the one of the first portion or the second portion of the plurality of heating elements is inactive.

4. The method of claim 1, wherein each of the first portion and the second portion of the plurality of heating elements consists of a single respective heating element of the plurality of heating elements.

5. A method of heating a cooking medium in a fryer including a cooking chamber having a plurality of heating elements located therein, comprising:
   selectively activating a first portion of the plurality of heating elements while a second portion of the plurality of heating elements is inactive, wherein the second portion of the plurality of heating elements is part of a remaining portion of the plurality of heating elements that is inactive while the first portion of the plurality of heating elements is active;
   selectively deactivating the first portion of the plurality of heating elements;
   selectively activating the second portion of the plurality of heating elements while the first portion of the plurality of heating elements is inactive;
   selectively deactivating the second portion of the plurality of heating elements; and
   selectively activating a third portion of the remaining portion of the plurality of heating elements while the first portion and the second portion of the plurality of heating elements are inactive.

6. The method of claim 5, wherein the first portion and the second portion of the plurality of heating elements are selectively activated and deactivated so that the first portion and the second portion of the plurality of heating elements are activated alternatively.

7. The method of claim 5, wherein the first portion and the second portion of the plurality of heating elements are selectively activated and deactivated so that one of the first portion or the second portion of the plurality of heating elements is activated for a predetermined time before deactivating the one of the first portion or the second portion of the plurality of heating elements, and the other of the first portion or the second portion of the plurality of heating elements is activated for the predetermined time while the one of the first portion or the second portion of the plurality of heating elements is inactive.

8. The method of claim 5, wherein each of the first portion and the second portion of the plurality of heating elements consists of a single respective heating element of the plurality of heating elements.

9. A method of heating a cooking medium in a fryer including a cooking chamber having a plurality of heating elements located therein, comprising:

selectively activating a first portion of the plurality of heating elements while a second portion of the plurality of heating elements is inactive;

selectively deactivating the first portion of the plurality of heating elements; and selectively activating the second portion of the plurality of heating elements while the first portion of the plurality of heating elements is inactive, wherein the first portion of the plurality of heating elements is deactivated in response to a failure of a heating element of the first portion of the plurality of heating elements.

10. The method of claim 9, wherein the first portion and the second portion of the plurality of heating elements are selectively activated and deactivated so that the first portion and the second portion of the plurality of heating elements are activated alternatively.

11. The method of claim 9, wherein the first portion and the second portion of the plurality of heating elements are selectively activated and deactivated so that one of the first portion or the second portion of the plurality of heating elements is activated for a predetermined time before deactivating the one of the first portion or the second portion of the plurality of heating elements, and the other of the first portion or the second portion of the plurality of heating elements is activated for the predetermined time while the one of the first portion or the second portion of the plurality of heating elements is inactive.

12. The method of claim 9, wherein each of the first portion and the second portion of the plurality of heating elements consists of a single respective heating element of the plurality of heating elements.

* * * * *